(12) United States Patent
Futa et al.

(10) Patent No.: US 7,886,365 B2
(45) Date of Patent: Feb. 8, 2011

(54) CONTENT-LOG ANALYZING SYSTEM AND DATA-COMMUNICATION CONTROLLING DEVICE

(75) Inventors: Yuichi Futa, Osaka (JP); Motoji Ohmori, Hirakata (JP); Hirohito Kitatora, Osaka (JP); Natsume Matsuzaki, Mino (JP); Makoto Tatebayashi, Takarazuka (JP); Kaoru Yokotoa, Ashiya (JP)

(73) Assignee: Panasonic Corporation, Osaka (JP)

( * ) Notice: Subject to any disclaimer, the term of this patent is extended or adjusted under 35 U.S.C. 154(b) by 1285 days.

(21) Appl. No.: 10/457,466

(22) Filed: Jun. 10, 2003

(65) Prior Publication Data

US 2003/0228015 A1 Dec. 11, 2003

(30) Foreign Application Priority Data

Jun. 11, 2002 (JP) ............................. 2002-170253

(51) Int. Cl.
*G06F 21/24* (2006.01)
*H04L 12/28* (2006.01)
*H04L 29/06* (2006.01)

(52) U.S. Cl. ............................. 726/31; 726/26; 705/57; 705/58; 705/59

(58) Field of Classification Search ................. 713/201, 713/153; 726/31
See application file for complete search history.

(56) References Cited

U.S. PATENT DOCUMENTS 5,812,671 A 9/1998 Ross, Jr.
5,931,946 A * 8/1999 Terada et al. .................. 726/25
6,178,409 B1 * 1/2001 Weber et al. ................... 705/79
6,389,538 B1 * 5/2002 Gruse et al. ................. 713/194
6,560,651 B2 * 5/2003 Katz et al. .................... 709/229
6,859,790 B1 * 2/2005 Nonaka et al. ................. 705/51
7,059,516 B2 * 6/2006 Matsuyama et al. ......... 235/382
7,617,124 B1 * 11/2009 Ronning et al. ............... 705/26
2001/0056550 A1 12/2001 Lee
2002/0031134 A1 3/2002 Poletto et al.
2002/0032774 A1 3/2002 Kohler et al.
2002/0032880 A1 3/2002 Poletto et al.
2002/0035628 A1 3/2002 Gil et al.

(Continued)

FOREIGN PATENT DOCUMENTS

FR 2 806 503 9/2001

(Continued)

OTHER PUBLICATIONS

English translation of JP 2002-082849.*

(Continued)

*Primary Examiner*—Jung Kim
(74) *Attorney, Agent, or Firm*—Wenderoth, Lind & Ponack, L.L.P.

(57) ABSTRACT

In a content-log analyzing system, content includes additional information indicating, according to a property of the content, whether or not to record communication of the content in a content-log. When transmitting content to a TV or a PC, a data-communication controlling device judges whether or not to record the communication in a content-log based upon additional information of the content, and when judging affirmatively, generates and stores content-log information. A content-log analyzing server obtains the content-log stored in the data-communication controlling device, and analyzes the obtained content-log.

23 Claims, 18 Drawing Sheets

U.S. PATENT DOCUMENTS

| | | |
|---|---|---|
| 2002/0035683 A1 | 3/2002 | Kaashock et al. |
| 2002/0059144 A1* | 5/2002 | Meffert et al. ............... 705/51 |
| 2002/0095492 A1 | 7/2002 | Kaashock et al. |
| 2002/0103916 A1 | 8/2002 | Chen et al. |
| 2002/0131404 A1* | 9/2002 | Mehta et al. ............... 370/352 |
| 2002/0143955 A1* | 10/2002 | Shimada et al. ............ 709/227 |
| 2002/0161712 A1* | 10/2002 | Hatano et al. ............... 705/52 |
| 2003/0187957 A1* | 10/2003 | Huang et al. ............... 709/219 |
| 2004/0249768 A1* | 12/2004 | Kontio et al. ............... 705/65 |

FOREIGN PATENT DOCUMENTS

| | | |
|---|---|---|
| JP | 2002-082849 | 3/2002 |
| WO | 02/27443 | 4/2002 |

OTHER PUBLICATIONS

Schneier, Bruce: "Applied Cryptography, Second Edition", Jan. 1, 1996, John Wiley & Sons, Inc., New York, pp. 574-577.

Schneier, Bruce: "Applied Cryptography, Second Edition", Jan. 1, 1996, John Wiley & Sons, Inc., New York, pp. 47-51.

5C Digital Transmission Content Protection White Paper, (Revision 1.0, Jul. 14, 1998) pp. 1-13.

* cited by examiner

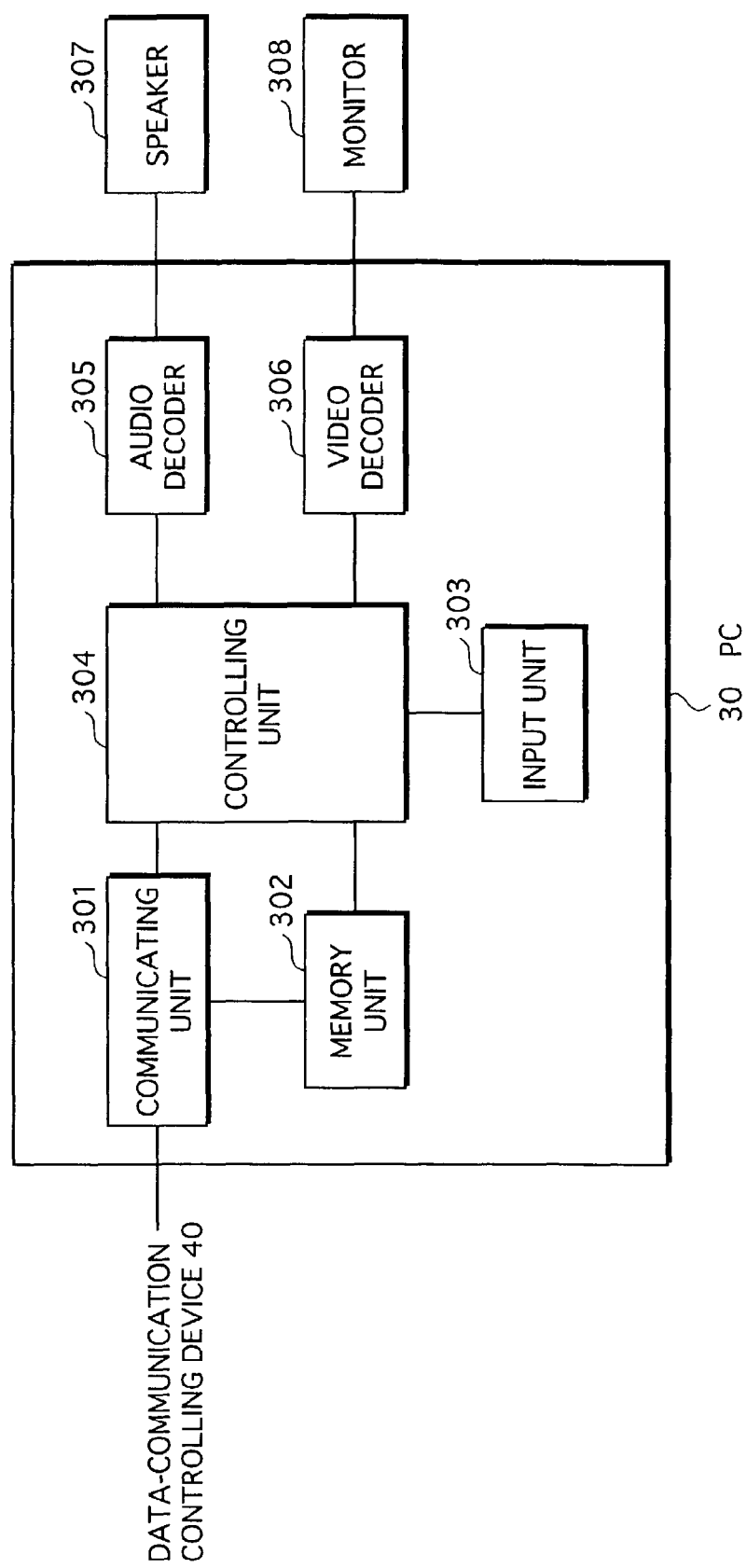

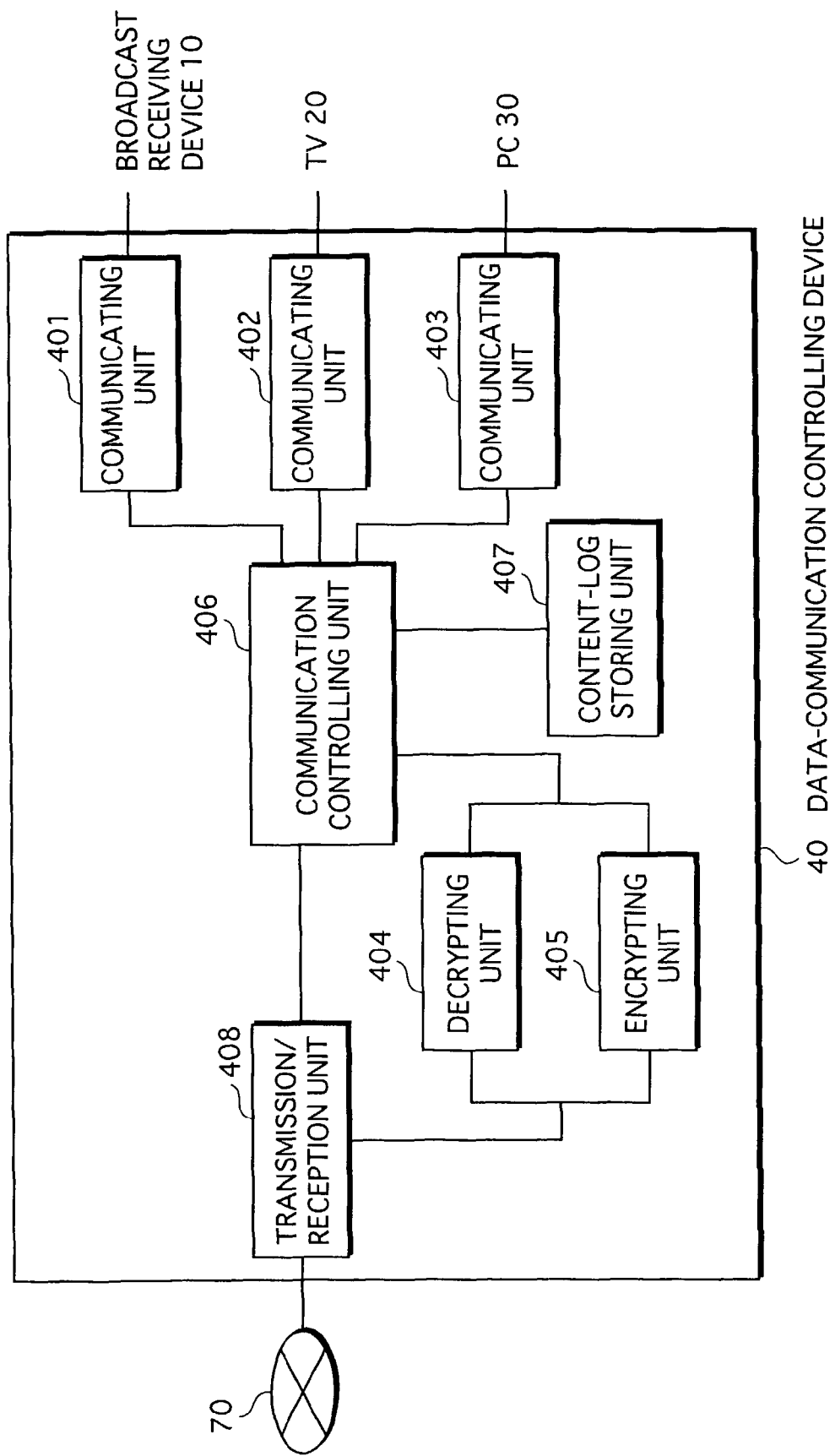

FIG.8

420 ADDRESS CONVERSION TABLE

| DEVICE ID | NETWORK ADDRESS |
|-----------|-----------------|
| IDC | IPC |
| IDA | IPA |
| IDB | IPB |

FIG.9

450 CONTENT-LOG TABLE

| TRANSMISSION TIME | CONTENT ID | TRANSMISSION TARGET DEVICE ID | TRANSMISSION SOURCE DEVICE ID |
|---|---|---|---|
| 10° 29' 33" | Program. 01 | IDA | IDC |
| 18° 10' 05" | Program. 05 | IDB | IDC |
| 18° 11' 29" | Program. 05 | IDB | IDC |
| 18° 13' 10" | Program. 05 | IDB | IDC |
| 20° 55' 43" | Program. 02 | IDA | IDC |
| ‥ | ‥ | ‥ | ‥ |

451, 452, 453, 454 → CONTENT-LOG INFORMATION

CONTENT-LOG ANALYZING SYSTEM AND DATA-COMMUNICATION CONTROLLING DEVICE

This application is based upon an application No. 2002-170253 filed in Japan, the content of which is hereby incorporated by reference.

BACKGROUND OF THE INVENTION (1) Field of the Invention

The present invention relates to a content distributing technique for transmitting and receiving content between devices connected to a home network, and particularly to a content-log analyzing technique for use in distributing content.

(2) Description of the Related Art

In recent years, the business of distributing "content" such as movies and music as being recorded on DVDs or CDs, or via the Internet or broadcast satellites has been widespread. Such content distributed from suppliers to users is copyrighted. In view of protecting the copyright, the suppliers are required to manage content so as not to allow the users to use the content beyond the scope of their-license.

The non-patent document 1 discloses a technique relating to DTCP (Digital Transmission Content Protection). The DTCP technique provides a system for mutual authentication between devices connected via the IEEE1394 high-speed serial bus. According to this technique, devices licensed to use content are each given a secret key. When one device intends to transmit or receive content to or from another device, the two devices first perform mutual authentication between them using their secret keys. Then, the device transmits or receives the content to the other device using a shared key resulting from the mutual authentication. Without an authentic license, therefore, a device cannot use content even if it belongs to a home network.

While great many pieces of content are provided to the users, some of them are highly valuable content (high-value content) for which a license that limits the number of copying times or the like is set. Examples of such high-value content include high-quality digital video, and movies released just recently. The suppliers desire to prohibit distribution of high-value content to such devices that may possibly decode and rewrite the license set for the high-value content. For example, a PC (personal computer) obtaining high-value content within a home network may possibly decode and rewrite its license. In such a case, the higher the frequency of the PC obtaining content, the higher the possibility of the PC having the intention to break the copyright protection. Non-patent Document 1: 5C Digital Transmission Content Protection White Paper (Revision 1.0 Jul. 14, 1998)

SUMMARY OF THE INVENTION

In view of the above problems, the object of the present invention is to provide a content distributing system that can detect at an early stage an unauthorized device that frequently obtains high-value content with the possible intention of breaking the content's copyright protection.

The above object of the present invention can be achieved by a content distributing system for transmitting content from a transmission device to a reception device via a routing device. The system includes the transmission device, the routing device, the reception device, and an analyzing device. The transmission device is operable to generate additional information of content according to a property of the content, the additional information indicating whether or not to log communication of the content when the content is transmitted from the routing device to the reception device, and transmit the additional information, a transmission target address specifying the reception device, and the content, to the routing device. The routing device is operable to receive the additional information, the transmission target address, and the content from the transmission device, and transmit the content to the reception device specified by the transmission target address, and when the additional information indicates to log the communication, generate log information indicating that the content has been routed from the transmission device to the reception device, and store the log information. The reception device is operable to receive the content transmitted from the routing device. The analyzing device is operable to obtain the log information from the routing device, and judge whether the reception device is an unauthorized device, based upon the obtained log information.

According to this construction, the routing device records the communication in the content-log when transmitting such content that includes additional information indicating to record the communication in the content-log. Accordingly, the analyzing device is given information about how many times the reception device has obtained the content. By comparing the number of times the reception device has obtained the content with a predetermined number of times, therefore, the analyzing device can judge a possibility of the content being subjected to attacking by the reception device.

The above object of the present invention can also be achieved by a transmission device that transmits content to a reception device via a routing device, the transmission device including an additional information generating unit operable to judge a property of content, and generate additional information of the content according to the property, the additional information indicating whether or not to log communication of the content when the content is transmitted from the routing device to the reception device, and a transmitting unit operable to transmit the additional information, a transmission target address specifying the reception device, and the content, to the routing device.

According to this construction, the transmission device can judge, as the property of content, a value of the content. The transmission device can then generate, for high-value content, additional information indicating to record the communication in the content-log, and for low-value content, additional information indicating not to record the communication in the content-log.

The above object of the present invention can also be achieved by a routing device that routes content from a transmission device to a reception device, the routing device including a receiving unit operable to receive content, additional information of the content, and a transmission target address specifying the reception device, from the transmission device, the additional information indicating, according to a property of the content, whether or not to log communication of the content when the content is transmitted from the routing device to the reception device, a routing unit operable to transmit the content to the reception device specified by the transmission target address, and a log information generating unit operable to generate log information indicating that the content has been routed from the transmission device to the reception device, and store the generated log information, when the additional information received by the receiving unit indicates to log the communication.

According to this construction, the routing device can generate content-log information according to the property of content.

Here, the routing device may have a device ID that uniquely identifies the routing device, and a certificate that is used to authenticate the device ID, and the routing device may further include a log request receiving unit operable to receive a log request from an analyzing device that analyzes log information, the log request requesting to transmit the log information stored in the log information generating unit, and a log transmitting unit operable to transmit, to the analyzing device, the device ID, the certificate, and the log information that is stored in the log information generating unit. The routing device may be authenticated by the analyzing device based upon the device ID and the certificate transmitted to the analyzing device.

According to this construction, the routing device transmits a certificate to be used to authenticate a device ID to the analyzing device. Therefore, the routing device is prohibited from altering the device ID, and also, the transmission source of the content-log can be clearly specified.

Further, the receiving unit may be operable to receive content that includes first encrypted content information, the first encrypted content information having been generated by encrypting, using first key information, content information that is composed of video data and audio data, and the routing device may further include a first key information obtaining unit operable to obtain the first key information, a decrypting unit operable to decrypt the first encrypted content information using the first key information obtained by the first key information obtaining unit, so as to generate first content information, a second key information storing unit operable to store second key information that is different from the first key information, an encrypting unit operable to encrypt the first content information generated by the decrypting unit, using the second information stored in the second key information storing unit, so as to generate second encrypted content information, and a transmitting unit operable to transmit content that includes the second encrypted content information generated by the encrypting unit, to the reception device.

According to this construction, content is encrypted twice each time using a different key before being transmitted or received, thereby enabling high-security to be maintained in transmitting and receiving the content.

Further, the first key information obtaining unit may include a third key information storing unit operable to store third key information that is different from the first key information and the second key information, an encrypted first key information receiving unit operable to receive, from the analyzing device, encrypted first key information generated by encrypting the first key information using the third key information, and a decrypting unit operable to decrypt the encrypted first key information received by the encrypted first key information receiving unit, using the third key information, so as to obtain the first key information.

According to this construction, encrypted key information generated by encrypting key information to be used to decrypt encrypted content is used, thereby enabling the security to be further enhanced.

Also, the routing device may further include an analyzing condition storing unit operable to store an analyzing condition that serves as a criterion to judge whether the reception device is an unauthorized device when the log information stored in the log information generating unit is analyzed, and an analyzing unit operable to analyze the log information based upon the analyzing condition, to judge whether the reception device is an unauthorized device.

According to this construction, the routing device is not required to transmit the content-log to the analyzing device, but can analyze the content-log internally stored therein, thereby enabling the processing to be simplified.

The above object of the present invention can also be achieved by an analyzing device that analyzes log information generated by a routing device that routes content from a transmission device to a reception device. The analyzing device includes an analyzing condition storing unit operable to store an analyzing condition that serves as a criterion to judge whether the reception device is an unauthorized device, when log information generated by the routing device is analyzed, a log receiving unit operable to obtain, from the routing device, log information indicating that content has been routed from the transmission device to the reception device, and an analyzing unit operable to analyze the log information received by the log receiving unit, based upon the analyzing condition stored in the analyzing condition storing unit, to judge whether the reception device is an unauthorized device.

According to this construction, an unauthorized reception device can be detected by the analyzing device analyzing the content-log obtained from the routing device.

Here, the routing device may have a device ID that uniquely identifies the routing device, and the analyzing device may further include a log transmission table storing unit operable to store a log transmission table showing a device ID of the routing device that has transmitted log information to the analyzing device in response to a log request from the analyzing device, the log request requesting to transmit the log information, a device ID receiving unit operable to receive the device ID together with the log information, from the routing device, and a log transmission table writing unit operable to write the device ID into the log transmission table when the log receiving unit receives the log information and the device ID.

According to this construction, even when a plurality of routing devices each transmit its content-log to the analyzing device, the analyzing device can differentiate a routing device that has transmitted the content-log thereto and a routing device that has not transmitted the content-log thereto. Therefore, an unauthorized routing device can be detected.

Here, the routing device may have a device ID that uniquely identifies the routing device, and a certificate that is used to authenticate the device ID, and the analyzing device may further include a log transmission table storing unit operable to store a log transmission table showing a device ID of the routing device that has transmitted log information to the analyzing device in response to a log request from the analyzing device, the log request requesting to transmit the log information, a certificate receiving unit operable to receive the device ID and the certificate, together with the log information, from the routing device, an authenticating unit operable to authenticate the device ID by authenticating the certificate received by the certificate receiving unit, and a log transmission table writing unit operable to write the device ID into the log transmission table when the device ID is successfully authenticated by the authenticating unit.

According to this construction, the analyzing device receives and authenticates a certificate for the purpose of authenticating a device ID of the routing device. Therefore, a routing device transmitting the content-log together with an unauthorized device ID can be detected.

Here, the analyzing device may further include a key information generating unit operable to generate key information when the device ID is written into the log transmission table, an encryption key storing unit operable to store an encryption key that is different from the key information, an encrypting unit operable to encrypt the key information using the encryption key, so as to generate encrypted key information, and an encrypted key information transmitting unit operable to transmit the encrypted key information to the routing device identified by the device ID.

According to this construction, the analyzing device makes it a rule to transmit an encrypted content key to the routing device only when the routing device has transmitted the content-log thereto. This urges the routing device to transmit the content-log to the analyzing device.

The above object of the present invention can also be achieved by a content distributing system for transmitting content from a transmission device to a reception device via a routing device. The system includes the transmission device, the routing device, and the reception device. The transmission device is operable to transmit content, additional information of the content, and a transmission target address specifying the reception device, to the routing device, the additional information indicating, according to a property of the content, whether or not to log communication of the content when the content is transmitted from the routing device to the reception device. The routing device is operable to receive the content, the additional information, and the transmission target address, and transmit the content to the reception device specified by the transmission target address, and when the additional information indicates to log the communication, generate log information indicating that the content has been routed from the transmission device to the reception device, and analyze the generated log information based upon an analyzing condition internally stored therein, to judge whether the reception device is an unauthorized device. The reception device is operable to receive the content transmitted from the routing device.

According to this construction, the routing device records the communication in the content-log when transmitting such content that includes additional information indicating to record the communication in the content-log. Accordingly, the analyzing device is given information about how many times the reception device has obtained the content. The analyzing device therefore can judge a possibility of the content being subjected to attacking by the reception device.

Here, the content distributing system may further include an analyzing-condition updating device operable to transmit, to the routing device, information for updating the analyzing condition stored in the routing device. The routing device may be operable to receive the update information from the analyzing-condition updating device and update the analyzing condition internally stored therein based upon the received update information.

According to this construction, the analyzing condition can be changed by an instruction from the content management center that manages content.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 5 is a block diagram showing the construction of a PC 30;

FIG. 6 is a block diagram showing the construction of a data-communication controlling device 40;

FIG. 8 shows the data structure of an address conversion table stored in the data-communication controlling device 40;

FIG. 9 shows the data structure of a content-log table stored in the data-communication controlling device 40;

FIG. 15 is a block diagram showing the construction of a data-communication controlling device 40a;

DESCRIPTION OF THE PREFERRED EMBODIMENTS

First Embodiment

The following describes a content-log analyzing system 1 as a first embodiment of the present invention, with reference to the drawings.

<Construction>

Figure 1:
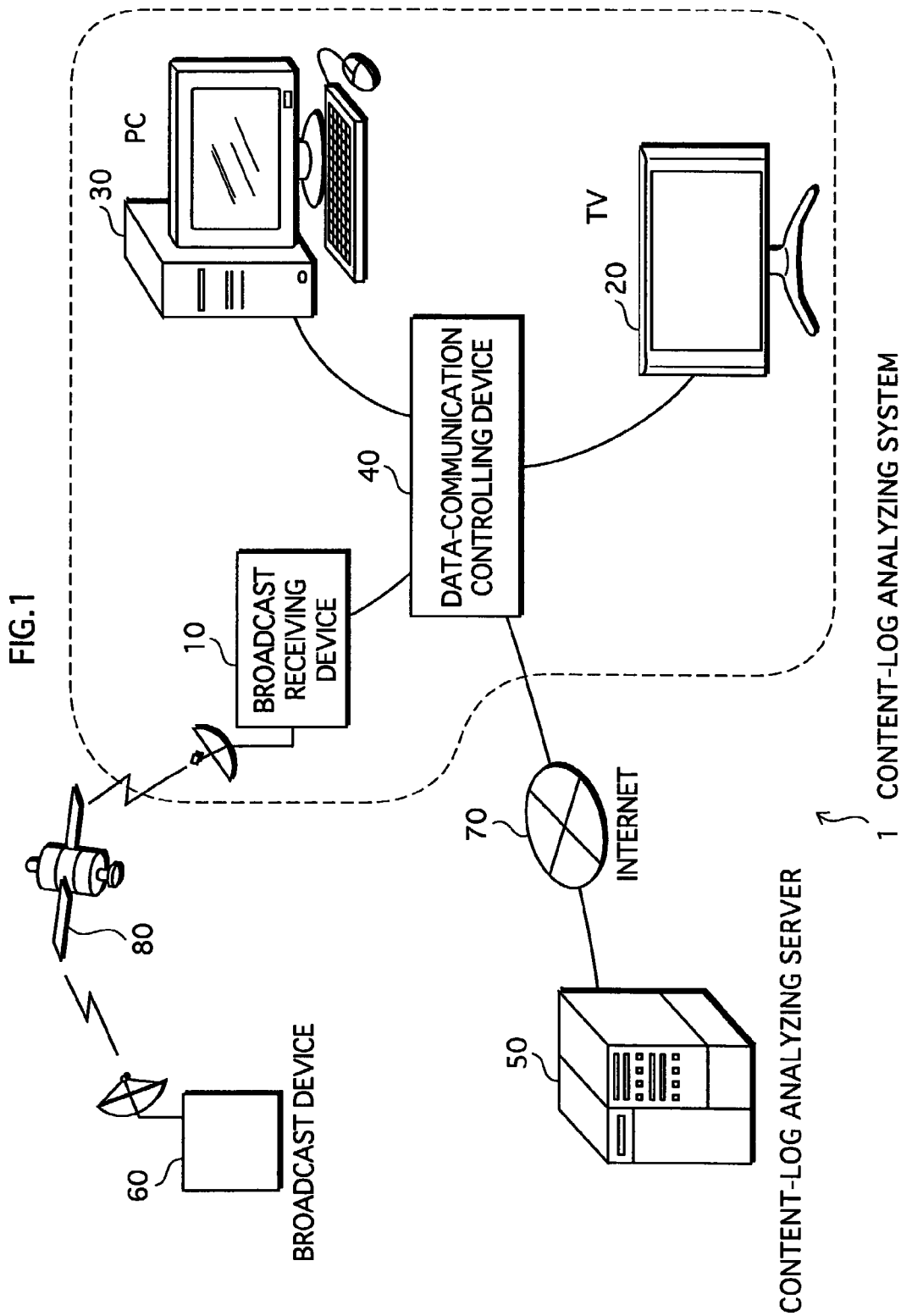
FIG. 1 shows the construction of a content-log analyzing system 1.

FIG. 1 shows the construction of the content-log analyzing system 1. As shown in the figure, the content-log analyzing system 1 is composed of a broadcast receiving device 10, a TV (television) 20, a PC (personal computer) 30, a data-communication controlling device 40, a content-log analyzing server 50, and a broadcast device 60.

In FIG. 1, the broadcast receiving device 10, the TV 20, the PC 30, and the data-communication controlling device 40 encircled by a broken line are devices placed in a home of the user who views and/or listens to content. The broadcast receiving device 10, the TV 20, and the PC 30 are each connected to the data-communication controlling device 40 via a LAN cable, and communicate with the data-communication controlling device 40. The content-log analyzing server 50 and the broadcast device 60 are placed in a convent provision center that provides content. The content-log analyzing server 50 is connected to the data-communication controlling device 40 via an Internet 70. The broadcast device 60 broadcasts content via a broadcast satellite 80.

The following describes each component of the system 1 in detail.

1. Broadcast Receiving Device 10

The broadcast receiving device 10 receives and stores encrypted content that is broadcasted from the broadcast device 60 via the broadcast satellite 80. Within the home network, the broadcast receiving device 10 is connected to the data-communication controlling device 40 via a LAN cable. The broadcast receiving device 10 receives a request for playing back content (hereafter, a "content request") from the TV 20 or the PC 30 via the data-communication controlling device 40, and transmits the requested content that is in an encrypted form, to the data-communication controlling device 40.

Figure 2:
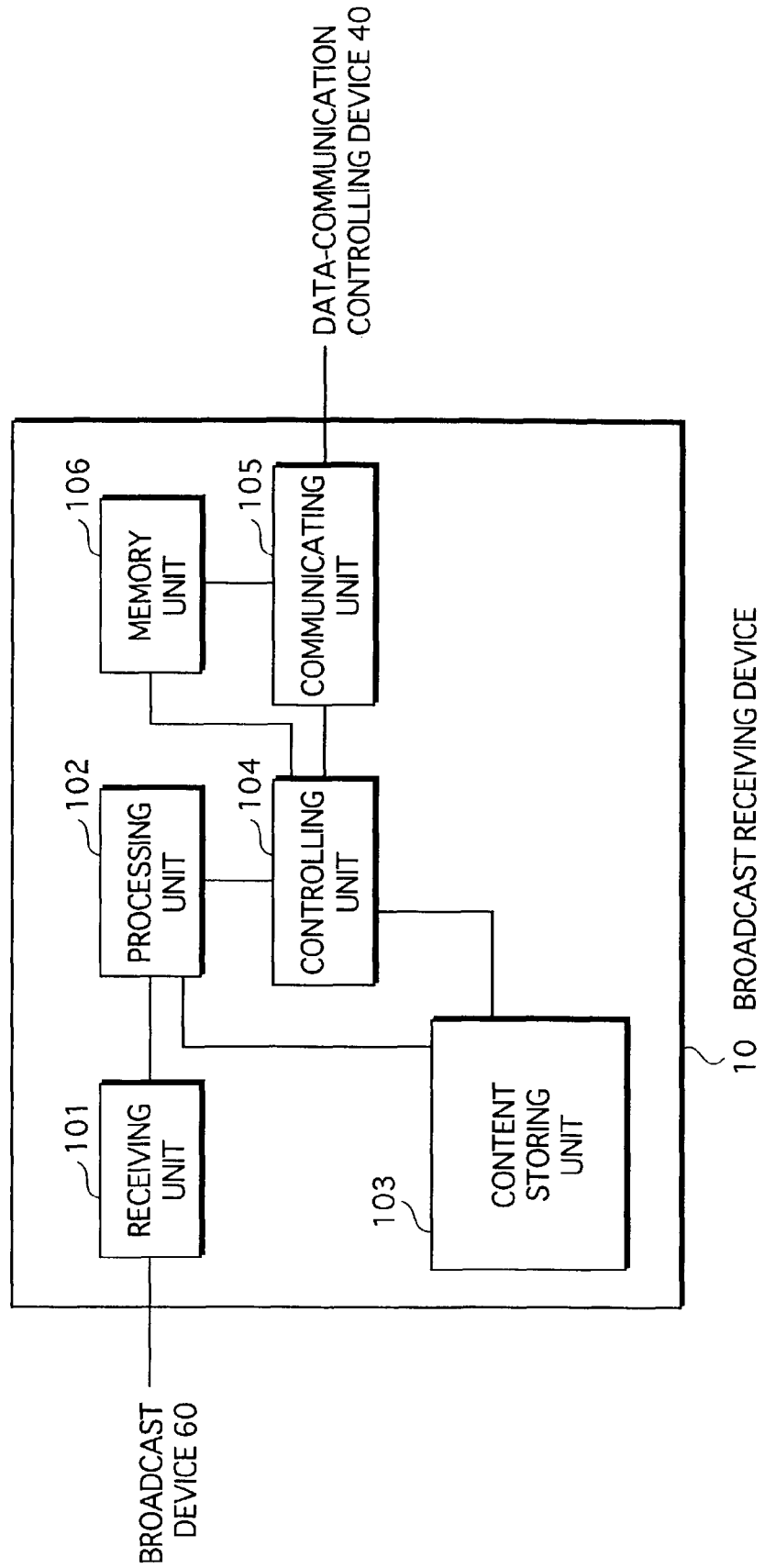
FIG. 2 is a block diagram showing the construction of a broadcast receiving device 10.

FIG. 2 is a block diagram showing the construction of the broadcast receiving device 10. As shown in the figure, the broadcast receiving device 10 is composed of a receiving unit 101, a processing unit 102, a content storing unit 103, a controlling unit 104, a communicating unit 105, and a memory unit 106.

(1) Receiving Unit 101

The receiving unit 101 includes an antenna, and receives, via the antenna, a digital broadcast wave that is broadcasted from the broadcast device 60 via the broadcast satellite 80. The receiving unit 101 extracts, from the received digital broadcast wave, packets that constitute encrypted content, and outputs the extracted packets one after another to the processing unit 102.

(2) Processing Unit 102

The processing unit 102 receives packets one after another from the receiving unit 101, and reconstructs encrypted content using the received packets, and stores the encrypted content into the content storing unit 103.

(3) Content Storing Unit 103

The content storing unit 103 is specifically a hard disk unit, and stores encrypted content that is outputted from the processing unit 102.

Figure 3:
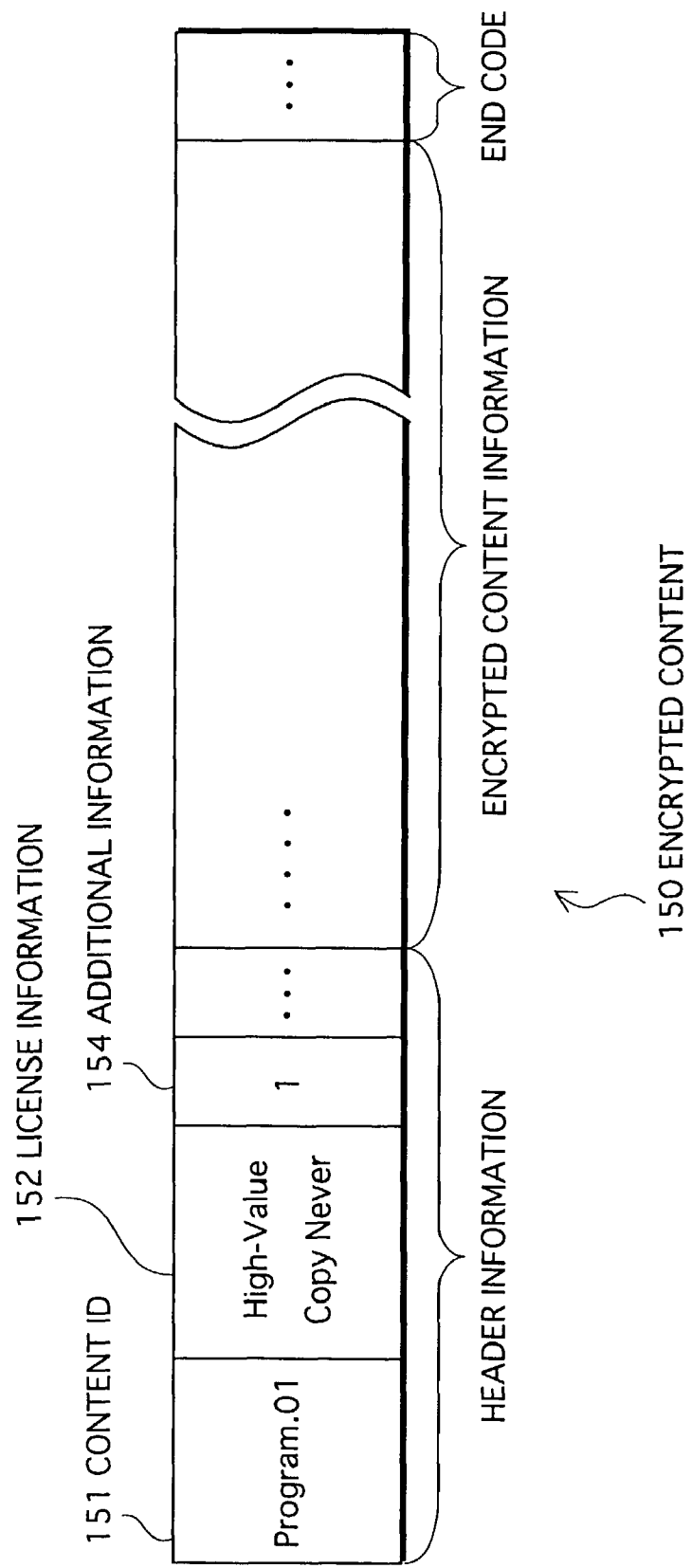
FIG. 3 shows the data structure of encrypted content.

The encrypted content 150 shown in FIG. 3 is one example of encrypted content stored in the content storing unit 103.

As shown in the figure, the encrypted content 150 is composed of header information, encrypted content information, and end code. The header information includes "content ID" 151, "license information" 152, "additional information" 154, "data size of header information", and the like.

The "content ID" is an ID used to uniquely identify content. The "content ID" 151 of the encrypted content 150 is "Program. 01".

The "license information" is information describing a content type and copy control information of content. To be specific, the content type is "High-Value" or "Free", and the copy control information is "Copy Free", "Copy Once", "Copy No More", or "Copy Never". In the case of the "license information" 152 of the encrypted content 150, the content type is "High-Value" and the copy control information is "Copy Never".

The "additional information" is used to judge whether or not to record the communication in the "log" for content's communication (hereafter, the "content-log") when the content is distributed to a certain device within the home network via a LAN cable. The "additional information" is a flag set at "0" or "1". The additional information being "1" indicates to record the communication in the content-log, whereas the additional information being "2" indicates not to record the communication in the content-log. The "additional information" 154 of the encrypted content 150 is "1". The additional information is described in more detail later.

The "data size of header information" is a data length of the header information expressed in units of bytes. It should be noted here that the "data size of header information" is not shown in FIG. 3.

The encrypted content information is specifically main data of the content that has been encrypted by the broadcast device 60 using a content key "KC" as an encryption key, according to the encryption algorithm "E1". To be specific, the DES (Data Encryption Standard) is employed as the encryption algorithm "E1".

The end code is a predetermined bit sequence representing the end of the content.

(4) Controlling Unit 104

The controlling unit 104 includes a CPU, a ROM, a RAM, and the like. The controlling unit 104 controls the entire broadcast receiving device 10 by its CPU executing a computer program stored in its ROM.

The controlling unit 104 receives a content request from the data-communication controlling device 40 via the communicating unit 105. The controlling unit 104 reads a content ID included in the received request, and reads encrypted content having the same content ID, from the content storing unit 103. The controlling unit 104 outputs the read encrypted content to the communicating unit 105.

(5) Communicating Unit 105

The communicating unit 105 is a LAN-connected unit including an IEEE1394 connector and the like, and is connected to the data-communication controlling device 40 via a LAN cable. The communicating unit 105 receives the encrypted content from the controlling unit 104, divides the encrypted content into packets, and transmits the packets one after another to the data-communication controlling device 40.

(6) Memory Unit 106

The memory unit 106 is connected to the communicating unit 105. In the memory unit 106, a network address "IPC", a device ID "IDC", and a certificate "CIDC" are stored. The network address "IPC" is an IP address that is transmitted from the data-communication controlling device 40 when the broadcast receiving device 10 is newly connected to the data-communication controlling device 40. The device ID "IDC" is specifically a MAC address assigned to a NIC (Network Interface Card) at the time of manufacture. The certificate "CIDC" has been issued by a certification authority and is used to authenticate the device ID "IDC".

It should be noted here that the device ID "IDC" and the certificate "CIDC" are stored at an OS level or a BIOS level to prevent them from being tampered by the user.

2. TV 20

The TV 20 is a device for decoding, and playing back content, i.e., displaying content. The TV 20 is specifically a computer system that is composed of a microprocessor, a ROM, a RAM, a LAN-connected unit, and the like.

Figure 4:
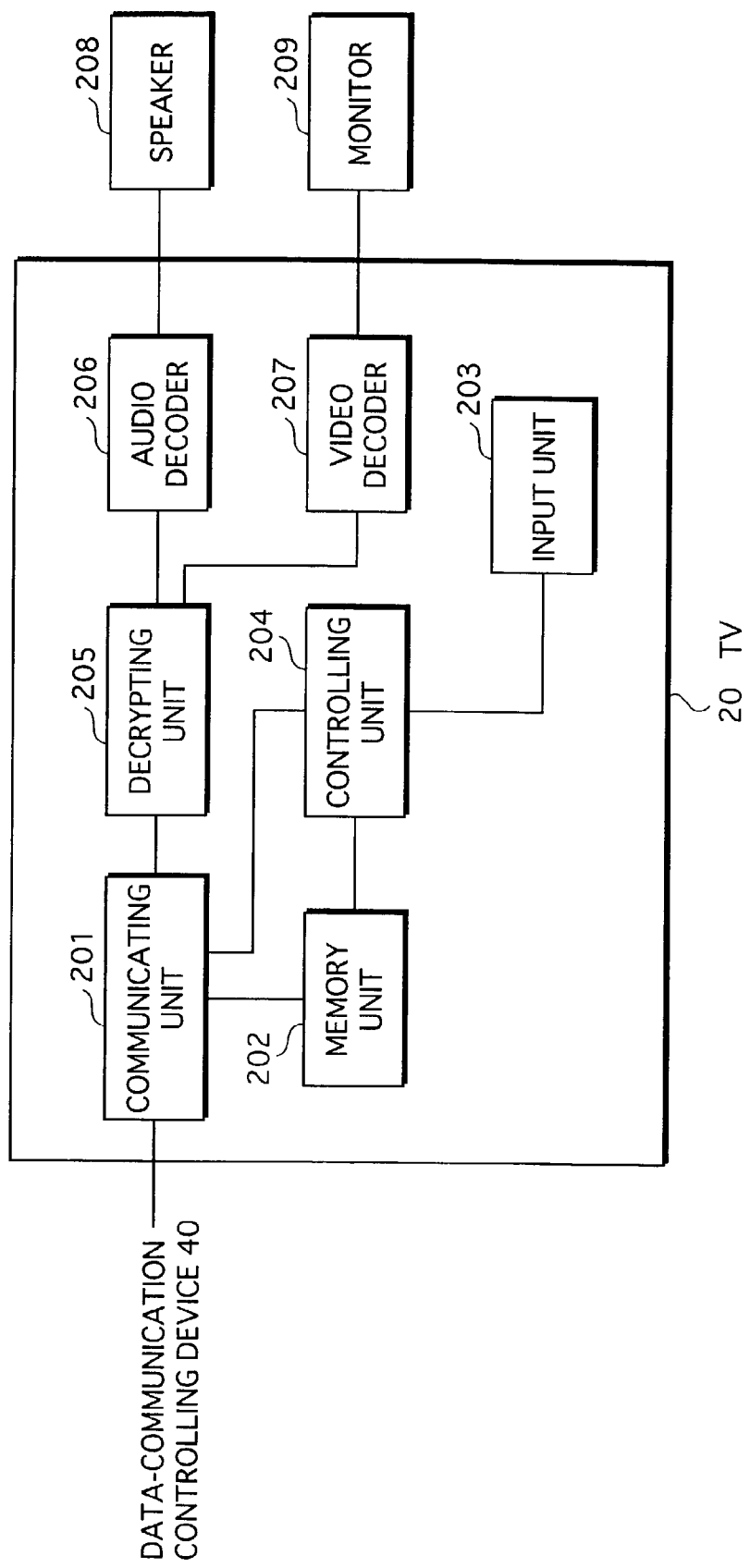
FIG. 4 is a block diagram showing the construction of a TV 20.

FIG. 4 is a block diagram showing the construction of the TV 20. As shown in the figure, the TV 20 is composed of a communicating unit 201, a memory unit 202, an input unit 203, a controlling unit 204, a decrypting unit 205, an audio decoder 206, a video decoder 207, a speaker 208, and a monitor 209.

(1) Communicating Unit 201

The communicating unit 201 is a LAN-connected unit including an IEEE1394 connector and the like. Via a LAN cable, the communicating unit 201 is connected to the data-communication controlling device 40.

The communicating unit 201 receives a content request, and a network address "IPA" outputted from the controlling unit 204, and transmits the received content request and network address "IPA" to the data-communication controlling device 40.

Also, the communicating unit 201 receives packets of encrypted content from the data-communication controlling device 40, and outputs the packets of encrypted content to the decrypting unit 205.

(2) Memory Unit 202

The memory unit 202 is connected to the communicating unit 201. In the memory unit 202, a network address "IPA", a device ID "IDA", and a certificate "CIDA" are stored. The network address "IPA" is an IP address transmitted from the data-communication controlling device 40 when the TV 20 is newly connected to the data-communication controlling device 40. The device ID "IDA" is specifically a MAC address assigned to a NIC at the time of manufacture. The certificate "CIDA" has been issued by a certification authority and is used to authenticate the device ID "IDA".

It should be noted here that the device ID "IDA" and the certificate "CIDA" are stored at an OS level or a BIOS level to prevent them from being tampered by the user.

(3) Input Unit 203

The input unit 203 is specifically a user interface including a button and the like. Upon receipt of a user operation of the button and the like, the input unit 203 generates an input signal corresponding to the operation, and outputs the generated input signal to the controlling unit 204.

When the user operation indicates a request for playing back content, the input unit 203 generates, as the input signal, a content request including a content ID, and outputs the generated content request to the controlling unit 204.

(4) Controlling Unit 204

The controlling unit 204 includes a CPU, a ROM, a RAM, and the like. The controlling unit 204 controls the entire TV 20 by its CPU executing a computer program stored in its ROM.

The controlling unit 204 receives an input signal from the input unit 203, and executes processing suitable for the received input signal. Upon receipt of a content request including a content ID as an input signal from the input unit 203, the controlling unit 204 reads the network address "IPA" stored in the memory unit 202, and transmits the read network address "IPA" and the content request, to the data-communication controlling device 40 via the communicating unit 201.

(5) Decrypting Unit 205

The decrypting unit 205 includes a CPU, a ROM, a RAM, and the like, and internally stores a device key "KA".

The decrypting unit 205 receives encrypted content from the communicating unit 201, and decrypts the encrypted content in the following way, so as to generate content.

The decrypting unit 205 first refers to the "data size of header information" included in header information of the encrypted content, to detect a start position of the encrypted content information. The decrypting unit 205 then starts decrypting, from the detected start position, the encrypted content information using the device key "KA" according to the decryption algorithm "D2", so as to generate content information. The decrypting unit 205 continues the decryption process of the encrypted content information until detecting the end code. It should be noted here that an algorithm designed to decrypt data that has been encrypted according to the encryption algorithm "E2" is employed as the decryption algorithm "D2".

The decrypting unit 205 demultiplexes the content information into an audio stream and a video stream, and outputs the audio stream to the audio decoder 206 and the video stream to the video decoder 207.

(6) Audio Decoder 206

The audio decoder 206 receives an audio stream from the decrypting unit 205, expands the received audio stream to an audio signal, and outputs the audio signal to the speaker 208.

(7) Video Decoder 207

The video decoder 207 receives a video stream from the decrypting unit 205, expands the received video stream to a video signal, and outputs the video signal to the monitor 209.

3. PC 30

The PC 30 is a personal computer system that is composed of a microprocessor, a ROM, a RAM, a hard disk unit, a display unit, a keyboard, a mouse, a LAN-connected unit, and the like.

FIG. 5 is a block diagram showing the construction of the PC 30. As shown in the figure, the PC 30 is composed of a communicating unit 301, a memory unit 302, an input unit 303, a controlling unit 304, an audio decoder 305, a video decoder 306, a speaker 307, and a monitor 308.

(1) Communicating Unit 301

The communicating unit 301 is a LAN-connected unit including an IEEE1394 connector and the like, and is connected to the data-communication controlling device 40 via a LAN cable.

The communicating unit 301 receives a content request and a network address "IPB" from the controlling unit 304, and transmits the received content request and network address to the data-communication controlling device 40.

Also, the communicating unit 301 receives packets of encrypted content from the data-communication controlling device 40, and outputs the packets of encrypted content to the controlling unit 304.

(2) Memory Unit 302

The memory unit 302 is connected to the communicating unit 301. In the memory unit 302, a network address "IPB", a device ID "IDB", and a certificate "CIDB" are stored. The network address "IDB" is an IP address transmitted from the data-communication controlling device 40 when the PC 20 is newly connected to the data-communication controlling device 40 as described above. The device ID "IDB" is specifically a MAC address assigned to a NIC at the time of manufacture. The certificate "CIDB" has been issued by a certification authority and is used to authenticate the device ID "IDB".

It should be noted here that the device ID "IDB" and the certificate "CIDB" are stored at an OS level or a BIOS level to prevent them from being tampered by the user.

(3) Input Unit 303

The input unit 303 is specifically a user interface including a keyboard, a mouse, and the like. Upon receipt of a user operation of the keyboard, mouse, or the like, the input unit 303 generates an input signal corresponding to the operation, and outputs the generated input signal to the controlling unit 304.

When the user operation indicates a request for playing back content, the input unit 303 generates, as the input signal, a content request including a content ID, and outputs the generated content request to the controlling unit 304.

(4) Controlling Unit 304

The controlling unit 304 includes a CPU, a ROM, a RAM, an HDD, and the like. The controlling unit 304 controls the entire PC 30 by its CPU executing a computer program stored in its ROM or HDD.

The controlling unit 304 receives an input signal from the input unit 303, and executes processing suitable for the received input signal. Upon receipt of a content request including a content ID as an input signal from the input unit 303, the controlling unit 304 reads the network address "IPB" stored in the memory unit 302, and transmits the read network address "IPB" and the content request, to the data-communication controlling device 40 via the communicating unit 301.

Also, the controlling unit 304 internally stores a device key "KB". The device key "IKB" is a decryption key to be used to decrypt encrypted content when the PC 30 receives the encrypted content from the data-communication controlling device 40.

Upon receipt of encrypted content including encrypted content information encrypted using the device key "KB" from the data-communication controlling device 40, the controlling unit 304 decrypts the encrypted content in the following way, so as to generate content.

The controlling unit 304 first refers to the "data size of header information" included in header information of the encrypted content, to detect a start position of the encrypted content information. The controlling unit 304 then starts decrypting, from the detected start position, the encrypted content information using the device key "KB" as a decryption key, according to the decryption algorithm "D2", so as to generate content information. The controlling unit 304 continues the decryption process of the encrypted content information until detecting the end code. The controlling unit 304 demultiplexes the content information, into an audio stream and a video stream, and outputs the audio stream to the audio decoder 305 and the video stream to the video decoder 306.

(5) Audio Decoder 305

The audio decoder 305 receives an audio stream from the controlling unit 304, expands the received audio stream to an audio signal, and outputs the audio signal to the speaker 307.

(6) Video Decoder 306

The video decoder 306 receives a video stream from the controlling unit 304, expands the received video stream to a video signal, and outputs the video signal to the monitor 308.

4. Data-Communication Controlling Device 40

The data-communication controlling device 40 routes content from the broadcast receiving device 10 to the TV 20 or to the PC 30. Also, the data-communication controlling device 40 is connected to the content-log analyzing server 50 via the Internet 70. The data-communication controlling device 40, being connected at a juncture of the home network and another network external to the home network, functions as a secure router or a gateway for controlling transmission of content from the home network to the external network. Upon receipt of an instruction from the content-log analyzing server 50, the data-communication controlling device 40 transmits the content-log recorded therein, to the content-log analyzing server 50.

FIG. 6 is a block diagram showing the construction of the data-communication controlling device 40. As shown in the figure, the data-communication controlling device 40 is composed of communicating units 401, 402, and 403, a decrypting unit 404, an encrypting unit 405, a communication controlling unit 406, a content-log storing unit 407, and a transmission/reception unit 408.

(1) Communicating Units 401, 402, and 403

The communicating unit 401 is specifically a LAN-connected unit including an IEEE1394 connector and the like, and is connected to the broadcast receiving device 10 via a LAN cable. The communicating unit 401 receives a content request and a network address transmitted from the TV 20 or PC 30 via the communication controlling unit 406, and transmits the received content request and network address to the broadcast receiving device 10.

The communicating unit 402 has the same construction and function as the communicating unit 401, and is connected to the TV 20 via a LAN cable. The communicating unit 402 receives a content request and the network address "IPA" from the TV 20, and transmits the received content request and network address "IPA" to the communicating unit 401 via the communication controlling unit 406. Also, the communicating unit 402 divides encrypted content outputted from the communication controlling unit 406 via the communicating unit 401 into packets, and transmits the packets one after another to the TV 20.

The communicating unit 403 has the same construction and function as the communicating units 401 and 402, and is connected to the PC 30 via a LAN cable. The communicating unit 403 receives a content request and the network address "IPB" from the PC 30, and transmits the received content request and network address "IPB" to the communicating unit 401 via the communication controlling unit 406. Also, the communicating unit 403 divides encrypted content outputted from the communication controlling unit 406 via the communicating unit 401 into packets, and transmits the packets one after another to the PC 30.

(2) Decrypting Unit 404

Figure 7A:
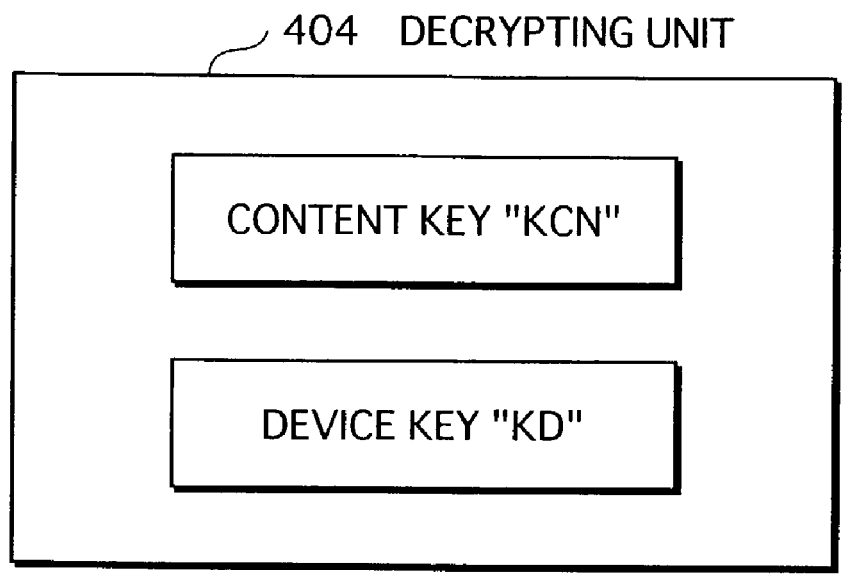
FIG. 7A shows key information stored in a decrypting unit 404 of the data-communication controlling device 40.

The decrypting unit 404 includes a CPU, a ROM, a RAM, and the like. As shown in FIG. 7A, the decrypting unit 404 internally stores a device key "KD" and a content key "KCN". The device key "KD" is recorded in advance on the ROM, and this key is shared with the content-log analyzing server 50. The content key "KCN" (where N is an integer equal to or greater than 2) is key information obtained by decrypting, using the device key "KD" as a decryption key, the encrypted content key "EKCN" received from the content-log analyzing server 50 via the Internet 70, the transmission/reception unit 408, and the communication controlling unit 406.

The decrypting unit 404 is provided in advance with a content key "KC1" from the content-log analyzing server 50. The decrypting unit 404 generates a new content key "KCN" by decrypting the encrypted content key "EKCN" using the device key "KD" upon every receipt of the encrypted content key "EKCN" from the content-log analyzing server 50. The decrypting unit 404 writes the new content key "KCN" over the content key "KC(N−1)" that has been stored therein.

The decrypting unit 404 receives encrypted content and a transmission target device ID from the broadcast receiving device 10 via the communicating unit 401 and the communication controlling unit 406. The decrypting unit 404 first refers to the "data size of header information" included in header information of the encrypted content, to detect a start position of the encrypted content information. The decrypting unit 404 then starts decrypting, from the detected start position, the encrypted content information using the device key "KC" as a decryption key, according to the decryption algorithm "D1", so as to generate content information. The decrypting unit 404 continues the decryption process of the encrypted content information until detecting the end code. The decrypting unit 404 then outputs the decrypted content and the transmission target device ID to the encrypting unit 405.

(3) Encrypting Unit 405

Figure 7B:
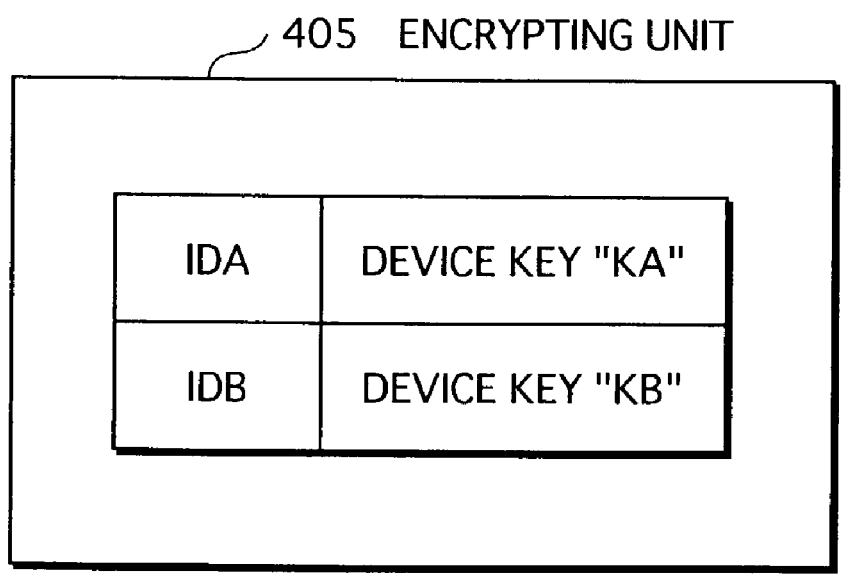
FIG. 7B shows key information stored in an encrypting unit 405 of the data-communication controlling device 40.

The encrypting unit 405 includes a CPU, a ROM, a RAM, and the like. As shown in FIG. 7B, the encrypting unit 405 stores the device ID "IDA" and the device key "KA" of the TV 20 in association with each other. The device key "KA" is an encryption key to be used to encrypt content when the content is transmitted to the TV 20. The encrypting unit 405 further stores the device ID "IDB" and the device key "KB" of the PC 30 in association with each other. The device key "KB" is an encryption key to be used to encrypt content when the content is transmitted to the PC 30.

The encrypting unit 405 stores the device key "KA" and the device ID "IDA" of the TV 20 in association with each other, and the device key "KB" and the device ID "IDB" of the PC 30 in association with each other.

The encrypting unit 405 receives content and a transmission target device ID from the decrypting unit 404. The encrypting unit 405 reads a device key associated with the received transmission target device ID, and encrypts the received content using the read device key according to the encryption algorithm "E2", so as to generate encrypted content.

To be specific, when the transmission target device ID received from the decrypting unit 404 is "IDA", the encrypting unit 405 encrypts content information included in the received content using the device key "KA" as an encryption key, according to the encryption algorithm "E2", so as to generate encrypted content information. The encrypting unit 405 outputs encrypted content that is composed of header information, the encrypted content information, and end code, together with the transmission target device ID "IDA", to the communication controlling unit 406.

When the transmission target device ID received from the decrypting unit 404 is "IDB", the encrypting unit 405 encrypts content information included in the received content using the device key "KB" as an encryption key, according to the encryption algorithm "E2", so as to generate encrypted content information. The encrypting unit 405 outputs encrypted content that is composed of header information, the encrypted content information, and end code, together with the transmission target device ID "IDB", to the communication controlling unit 406.

(4) Communication Controlling Unit 406

The communication controlling unit 406 includes a CPU, a ROM, a RAM, and the like. The communication controlling unit 406 controls the entire data-communication controlling device 40 by its CPU executing a computer program stored in its ROM.

The communication controlling unit 406 internally stores an address conversion table 420. As shown in FIG. 8, the address conversion table 420 is a table for associating a device ID and a network address of each of the devices connected to the data-communication controlling device 40 via the communicating units 401, 402, and 403. To be specific, a device ID is a MAC address, and a network address is an IP address assigned by the communication controlling unit 406 to each device when the device is newly connected thereto. Also, the communication controlling unit 406 internally has a clock.

(Content Request Transfer)

Upon receipt of a content request and the network address "IPA" from the TV 20 via the communicating unit 402, the communication controlling unit 406 transmits the received content request and network address "IPA" to the broadcast receiving device 10 via the communicating unit 401. Also, upon receipt of a content request and the network address "IPB" from the PC 30 via the communicating unit 403, the communication controlling unit 406 transmits the received content request and network address "IPB" to the broadcast receiving device 10 via the communicating unit 401.

(Content-Log)

The communication controlling unit 406 receives packets of encrypted content from the broadcast receiving device 10 via the communicating unit 401. The communication controlling unit 406 reads a transmission target address and a transmission source address included in a header of each of the received packets. The communication controlling unit 406 accumulates packets received from the broadcast receiving device 10, until being able to read a content ID and additional information included in header information of the encrypted content. Upon completion of reading the content ID and the additional information, the communication controlling unit 406 stops accumulating packets.

When the additional information is "0", the communication controlling unit 406 refers to the internally stored address conversion table 420 to obtain the transmission target device ID, without generating content-log information. The communication controlling unit 406 outputs the encrypted content and the transmission target device ID to the decrypting unit 404.

When the additional information is "1", the communication controlling unit 406 generates content-log information in the following way.

The communication controlling unit 406 first refers to the internally stored address conversion table 420, to obtain the transmission target device ID and the transmission source device ID.

The communication controlling unit 406 outputs the encrypted content and the transmission target device ID to the decrypting unit 404. Here, the communication controlling unit 406 records, as a transmission time, the time at which it transmits the first packet of encrypted content to the decrypting unit 404.

The communication controlling unit 406 generates content-log information that is composed of the transmission time, the content ID, the transmission target device ID, and the transmission source device ID. The communication controlling unit 406 additionally writes the generated content-log information, into the content-log table 450 stored in the content-log storing unit 407. The content-log table 450 herein is the content-log into which communication of content is to be recorded.

The communication controlling unit 406 receives the encrypted content that has been encrypted using a device key shared with the transmission target device, and the transmission target device ID, from the encrypting unit 405. The data-communication controlling device 406 then selects a communicating unit to which a device identified by the transmission target device ID is connected, and transmits the encrypted content to the transmission target device via the selected communicating unit.

(Content-Log Transmission)

The communication controlling unit 406 internally stores identification information "DID" and a certificate "S_DID". The identification information "DID" uniquely identifies the data-communication controlling device 40. The certificate "S_DID" is used to authenticate the identification information "DID". The certificate "S_DID" has been issued by a certification authority, and is composed of the identification information "DID", a certification authority name, and a serial number, each of which is digitally signed by the certification authority.

The communication controlling unit 406 is connected to the content-log analyzing server 50 via the transmission/reception unit 408 and the Internet 70, and receives at regular intervals, a request for transmitting its content-log (hereafter, a "content-log request") from the content-log analyzing server 50 via the Internet 70 and the transmission/reception unit 406. Upon receipt of the content-log request, the communication controlling unit 406 reads the content-log table 450 stored in the content-log storing unit 407, and transmits the read content-log table 450, together with the identification information "DID" and the certificate "S_DID", to the content-log analyzing server 50 via the transmission/reception unit 408 and the Internet 70.

(Content Key Update)

The communication controlling unit 406 receives an encrypted content key "EKCN" from the content-log analyzing server 50 via the Internet 70 and the transmission/reception unit 408. The communication controlling unit 406 outputs the encrypted content key "EKCN" to the decrypting unit 404.

The encrypted content key "EKCN" has been generated by the content-log analyzing server 50 encrypting the content key "KCN" using the device key "KD" as an encryption key. The content key "KCN" is key information that is different from the content key "KC" that has been stored in the decrypting unit 404.

The communication controlling unit 406 transmits the content-log to the content-log analyzing server 50, so that it can receive a new encrypted content key "EKCN" in exchange for the transmission of the content-log. As described later, the broadcast device 60 makes it a rule to broadcast content that is encrypted using a new content key "KCN". This means that encrypted content received from the broadcast receiving device 10 cannot be decrypted without first transmitting the content-log to the content-log analyzing server 50 and receiving the new encrypted content key "EKCN" in exchange for the transmission of the content-log.

(5) Content-Log Storing Unit 407

The content-log storing unit 407 internally stores the content-log table 450, and receives content-log information outputted from the communication controlling unit 406. Upon every receipt of content-log information from the communication controlling unit 406, the content-log storing unit 407 stores the received content-log information into the content-log table 450.

FIG. 9 shows the content-log table 450. The content-log table 450 stores a plurality of pieces of content-log information. Each piece of content-log information is composed of a transmission time, a content ID, a transmission target device ID, and a transmission source device ID. According to the content-log information 451 shown in the figure, for example, the content with the content ID "Program. 01" was transmitted from the device with the device ID "IDC" to the device with the device ID "IDA" at 10:29:33.

(6) Transmission/Reception Unit 408

The transmission/reception unit 408 is connected to the content-log analyzing server 50 via the Internet 70, and transmits and receives information between the content-log analyzing server 50 and the communication controlling unit 406.

The information that the transmission/reception unit 408 receives from the content-log analyzing server 50 is specifically a content-log request and a new encrypted content key "EKCN". The information that the transmission/reception unit 408 transmits to the content-log analyzing server 50 is specifically the identification information "DID", the certificate "S_DID", and the content-log table 450.

5. Content-Log Analyzing Server 50

The content-log analyzing server 50 is owned by a manager of content that is distributed in the content-log analyzing system 1. The content-log analyzing server 50 is specifically a computer system that is composed of a CPU, a ROM, a RAM, a hard disk unit, an Internet-connected unit, and the like. The content-log analyzing server 50 is connected to the data-communication controlling device 40 and to the broadcast device 60 via the Internet 70.

Figure 10:
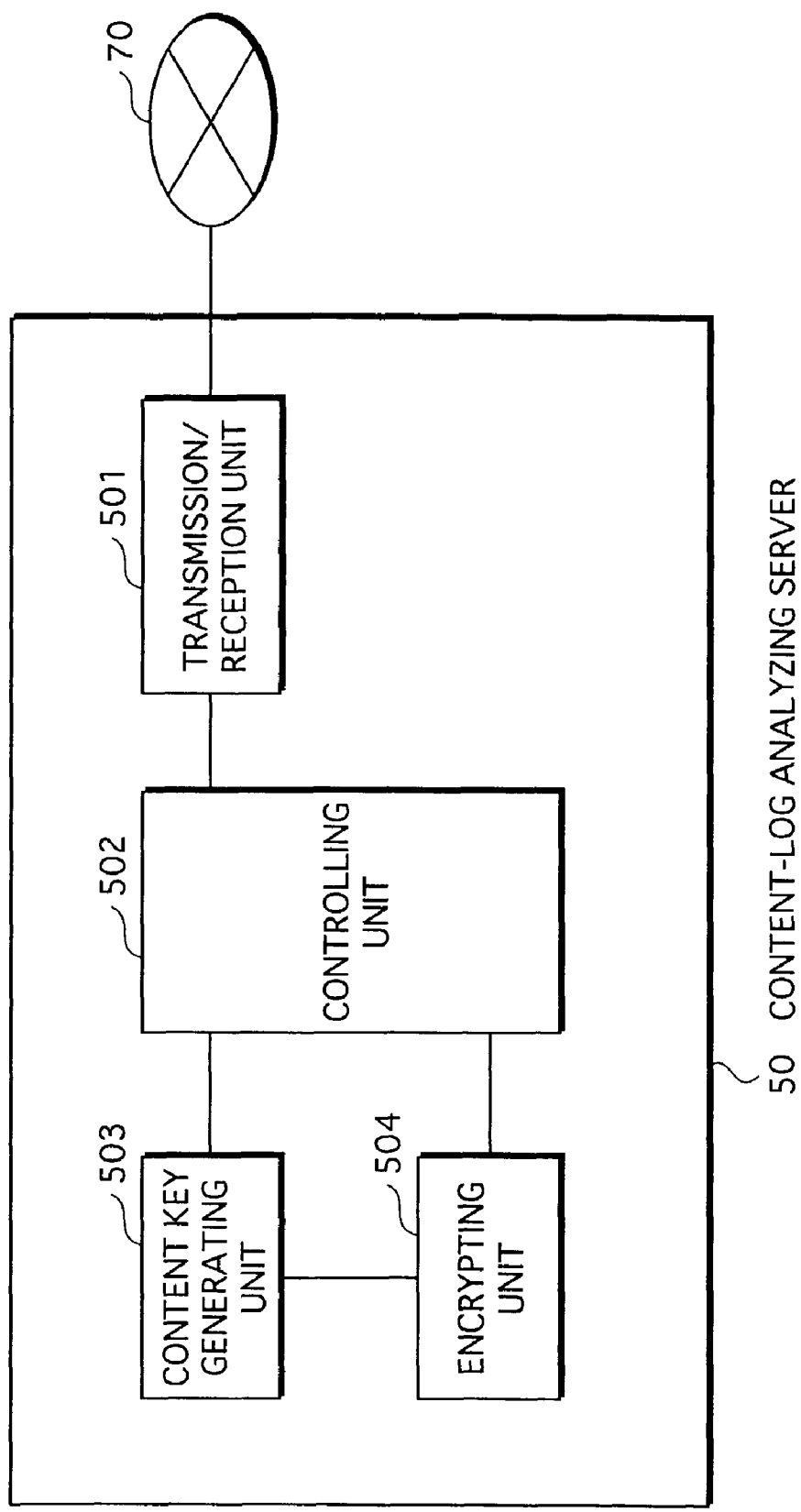
FIG. 10 is a block diagram showing the construction of a content-log analyzing server 50.

FIG. 10 is a block diagram showing the construction of the content-log analyzing server 50. As shown in the figure, the content-log analyzing server 50 is composed of a transmission/reception unit 501, a controlling unit 502, a content key generating unit 503, and an encrypting unit 504.

(1) Transmission/Reception Unit 501

The transmission/reception unit 501 is connected to the data-communication controlling device 40 via the Internet 70, and transmits and receives information between the controlling unit 502 and the data-communication controlling device 40.

The information that the transmission/reception unit 501 receives from the data-communication controlling device 40 is specifically the identification information "DID", the certificate "S_DID", and the content-log table 450. The information that the transmission/reception unit 501 transmits to the data-communication controlling device 40 is specifically a content-log request and a new encrypted content key "EKCN".

Also, the transmission/reception unit 501 is connected to the broadcast device 60 via the Internet 70. The transmission/reception unit 501 receives the content key "KCN" generated by the content key generating unit 503 via the controlling unit 502, and transmits the received content key "KCN" to the broadcast device 60 via the Internet 70.

(2) Controlling Unit 502

The controlling unit 502 includes a CPU, a ROM, a RAM, and the like. The controlling unit 502 controls the entire content-log analyzing server 50 by its CPU executing a computer program stored in its ROM.

(Content-Log Request)

The controlling unit 502 stores a content-log analyzing condition that is set in advance. The content-log analyzing condition includes an interval at which a content-log request is to be transmitted to the data-communication controlling device 40, and a method for analyzing the content-log table 450 received.

The controlling unit 502 internally has a clock, and transmits a content-log request according to the content-log analyzing condition, to the data-communication controlling device 40, via the transmission/reception unit 501 and the Internet 70. For example, when the content-log analyzing condition includes information indicating that the content-log is to be requested every 10 min., the controlling unit 502 outputs a content-log request every 10 min.

(Authentication of Identification Information and Certificate)

The controlling unit 502 internally stores a content-log transmission table. The content-log transmission table is a table for storing identification information of a device that has transmitted its content-log (i.e., content-log table) in response to a content-log request issued by the content-log analyzing server 50.

The controlling unit 502 receives the identification information "DID", the certificate "S_DID", and the content-log table 450 from the data-communication controlling device 40 via the Internet 70 and the transmission/reception unit 501. The controlling unit 502 authenticates the received certificate "S_DID". When the authentication is successful, the controlling unit 502 writes the received identification information "DID" into the content-log transmission table. Also, the controlling unit 502 stores the received content-log table 450.

Following this, the controlling unit 502 outputs an instruction to generate a new content key, to the content key generating unit 503.

(Content-Log Analysis)

The controlling unit 502 analyzes the content-log table 450 that has been received from the data-communication controlling device 40 and stored therein, based upon the content-log analyzing condition that has been set in advance. As a specific example, the following describes the case where (a) the content-log analyzing condition indicates "a device ID of a device accessing the same content three or more times within 10 min. is to be extracted" and (b) the content-log table 450 shown in FIG. 9 is stored therein.

The controlling unit 502 checks, one after another, the pieces of content-log information included in the content-log table 450. To be more specific, the controlling unit 502 checks the content-log information 452, the content-log information 453, and the content-log information 454. As a result of this checking, the controlling unit 502 judges that the device with the device ID "IDB" accessed the content with the content ID "Program.05" three times within 10 min., and accordingly determines that the device with the device ID "IDB" satisfies the above content-log analyzing condition. The controlling unit 502 generates a black list and writes the device ID "IDB" into the black list, for the purpose of thereafter monitoring the device with the device ID "IDB".

(3) Content Key Generating Unit 503

The content key generating unit 503 includes a CPU, a ROM, a RAM, and the like. The content key generating unit 503 is specifically a random number generator.

The content key generating unit 503 first generates a content key "KC1", and transmits the generated content key "KC1" to the data-communication controlling device 40 and the broadcast device 60 via the Internet 70. The content key generating unit 503 then receives an instruction to generate a new content key from the controlling unit 502. Upon every receipt of such an instruction, the content key generating unit 503 generates a new content key.

The content key generating unit 503 outputs the generated new content key to the encrypting unit 504, and also, transmits the generated new content key to the broadcast device 60 via the controlling unit 502, the transmission/reception unit 501, and the Internet 70.

(4) Encrypting Unit 504

The encrypting unit 504 includes a CPU, a ROM, a RAM, and the like, and internally stores a device key "KD". The device key "KD" is recorded in advance on the ROM, and this key is shared with the data-communication controlling device 40.

The encrypting unit 504 receives the content key "KCN" from the content key generating unit 503, and encrypts the received content key "KCN" using the device key "KD" as an encryption key, so as to generate an encrypted content key "EKCN". The encrypting unit 504 transmits the encrypted content key "EKCN" to the data-communication controlling device 40, via the controlling unit 502, the transmission/reception unit 501, and the Internet 70.

6. Broadcast Device 60

The broadcast device 60 is a computer system that is made up of a CPU, a ROM, a RAM, a hard disk unit, an Internet-connected unit, and the like.

The broadcast device 60 includes a content storing unit, a content key storing unit, and an encrypting unit.

The content storing unit stores content that is constructed by multiplexing video data and audio data together. The content key storing unit is provided in advance with the content key "KC1" from the content-log analyzing server 50. Upon receipt of the content key "KCN (N≧2)" generated by the content key generating unit 503 of the content-log analyzing server 50 via the Internet 70, the content key storing unit writes the received content key "KCN" over the content key "KC(N−1)". The encrypting unit reads content from the content storing unit, the content key "KCN" from the content key storing unit, and encrypts the read content using the content key "KCN" as an encryption key, according to the encryption algorithm "E1", so as to generate encrypted content.

The broadcast device 60 broadcasts the encrypted content on a digital broadcast wave via the broadcast satellite 80.

<Operation>

Figure 11:
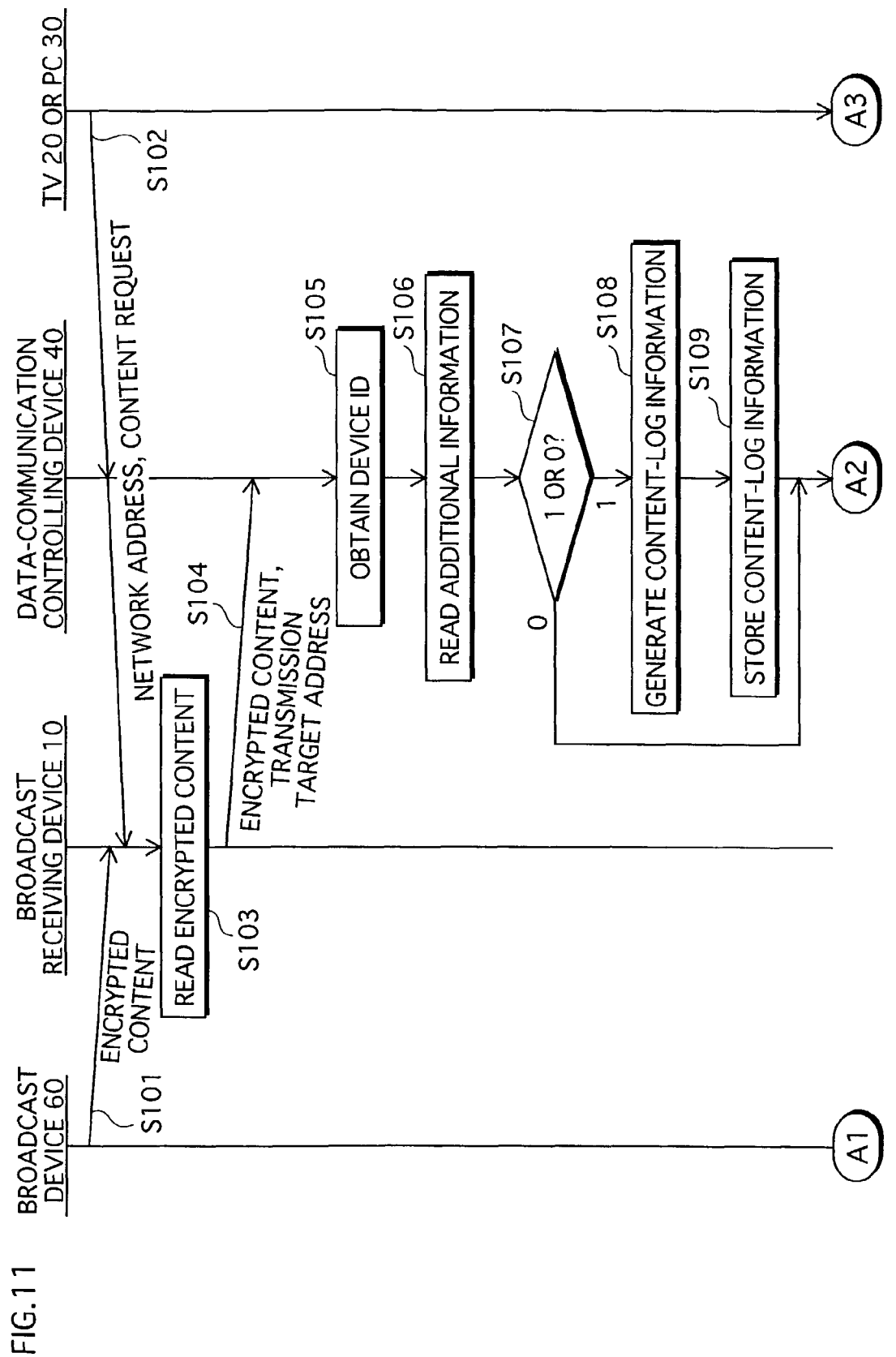
FIG. 11 is a flowchart showing the operation of the content-log analyzing system 1, to be continued to FIG. 12.
Figure 12:
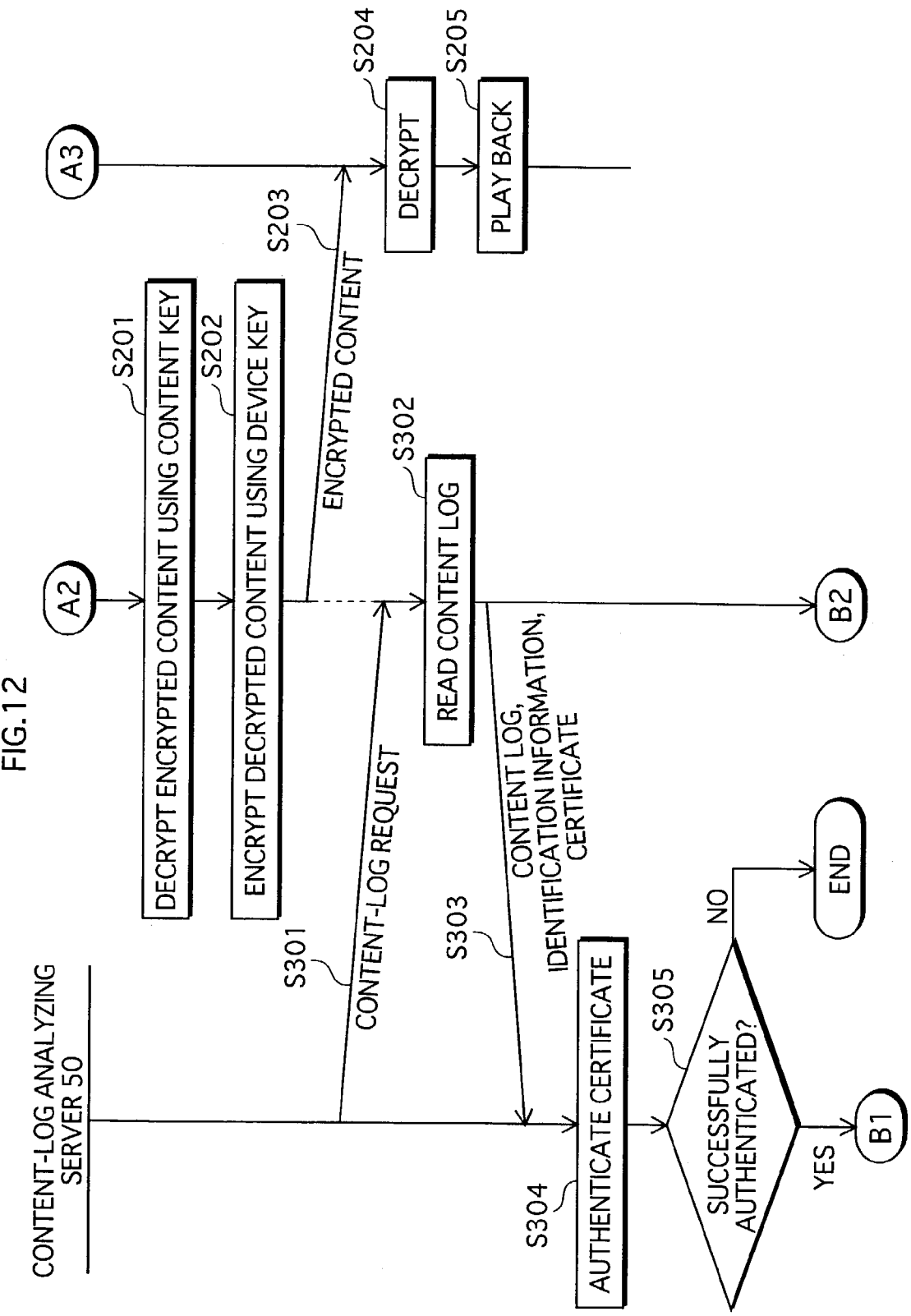
FIG. 12 is a flowchart showing the operation of the content-log analyzing system 1, to be continued to FIG. 13.
Figure 13:
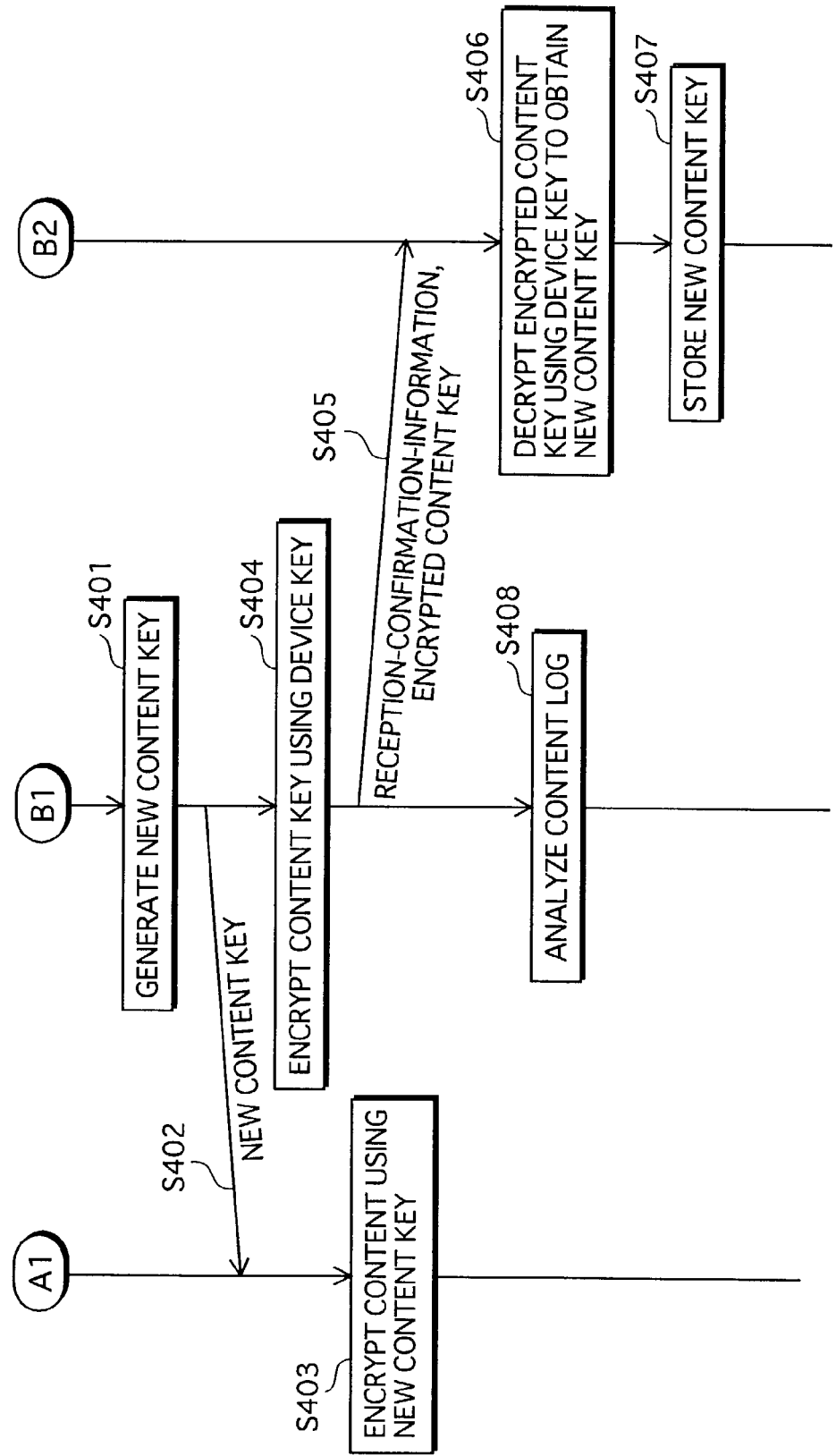
FIG. 13 is a flowchart showing the operation of the content-log analyzing system 1.

The following describes the operation of the content distributing system 1, with reference to flowcharts shown in FIGS. 11 to 13.

1. Content Transmission Process

The broadcast device 60 broadcasts digitized encrypted content on a digital broadcast wave, via the broadcast satellite 80. The broadcast receiving device 10 receives the encrypted content via the antenna (step S101), and stores the encrypted content into the content storing unit 103.

The TV 20 or the PC 30 transmits a content request including a content ID, and its internally stored network address, to the broadcast receiving device 10 via the data-communication controlling device 40. The broadcast receiving device 10 receives the content request and the network address (step S102). Here, the network address is "IPA" for the TV 20, and "IPB" for the PC 30.

The broadcast receiving device 10 reads encrypted content identified by the content ID included in the content request, from the content storing unit 103 (step S103). The broadcast receiving device 10 transmits the encrypted content and the transmission target address, to the data-communication controlling device 40. The data-communication controlling device 40 receives the encrypted content and the transmission target address (step S104).

The data-communication controlling device 40 obtains a device ID corresponding to the transmission target address, by referring to the internally stored address conversion table (step S105).

Following this, the data-communication controlling device 40 reads additional information included in the encrypted content received from the broadcast receiving device 10 (step S106). When the additional information is "0" ("0" in step S107), the data-communication controlling device 40 moves to step S201. When the additional information is "1" ("1" in step S107), the data-communication controlling unit 40 generates content-log information that is composed of a transmission time, a content ID, a transmission target device ID, and a transmission source device ID (step S108), and internally stores the generated content-log information (step S109).

The data-communication controlling device 40 decrypts the encrypted content using the content key "KC(N−1)" (step S201). Following this, the data-communication controlling device 40 encrypts the decrypted content using a device key shared with a device having the transmission target address, namely, the TV 20 or the PC 30, so as to generate encrypted content (step S202). The data-communication controlling device 40 transmits the encrypted content that has been encrypted using the device key, to the TV 20 or the PC 30. The TV 20 or the PC 30 receives the encrypted content (step S203)

The TV 20 or the PC 30 decrypts the encrypted content using its internally stored device key (step S204), and plays back the decrypted content (step S205). The TV 20 or the PC 30 returns to the start and continues the processing.

2. Content-Log Transmission Process

The content-log analyzing server 50 transmits start-information "I_S" indicating to start a content-log request process, to the data-communication controlling device 40. The data-communication controlling device 40 receives the start-information "I_S" (step S301). The data-communication controlling device 40 reads the content-log (step S302), and transmits the read content-log, together with the device identifier "DID" and the certificate "S_DID", to the content-log analyzing server 50. The content-log analyzing server 50 receives the content-log, the device identifier "DID", and the certificate "S_DID" (step S303). The content-log analyzing server 50 authenticates the received certificate "S_DID" (step S304). When the authentication is unsuccessful ("NO" in step S305), the content-log analyzing server 50 ends the process. When the authentication is successful ("YES" in step S305), the content-log analyzing server 50 generates a new content key "KCN" (step S401). The content-log analyzing server 50 transmits the new content key "KCN" to the broadcast device 60. The broadcast device 60 receives the new content key "KCN" (step S402). The broadcast device 60 encrypts the content using the received new content key "KCN". The broadcast device 60 returns to the start and continues the processing.

The content-log analyzing server 50 encrypts the generated new content key "KCN" using, as an encryption key, the device key "KD" that is shared with the data-communication controlling device 40, so as to generate an encrypted content key "EKCN" (step S404). The content-log analyzing server 50 transmits the encrypted content key "EKCN" and reception-confirmation-information "I_A" indicating that the content-log has been received, to the data-communication controlling device 40. The data-communication controlling device 40 receives the encrypted content key "EKCN" and the reception-confirmation-information "I_A" (step 5405). The data-communication controlling device 40 decrypts the encrypted content key "EKCN" using the device key "KD", so as to obtain the new content key "KCN" (step S406). The data-communication controlling device 40 writes the new content key "KCN" over the content key "KC(N−1)" that has been stored therein (step S407). The data-communication controlling device 40 returns to the start and continues the processing.

The content-log analyzing server 50 analyzes the content-log received in step S303, based upon its internally stored analyzing condition (step S408). The content-log analyzing server 50 returns to the start and continues the processing.

Second Embodiment

The following describes a content-log analyzing system 2 as a second embodiment of the present invention, with reference to the drawings.

<Construction>

Figure 14:
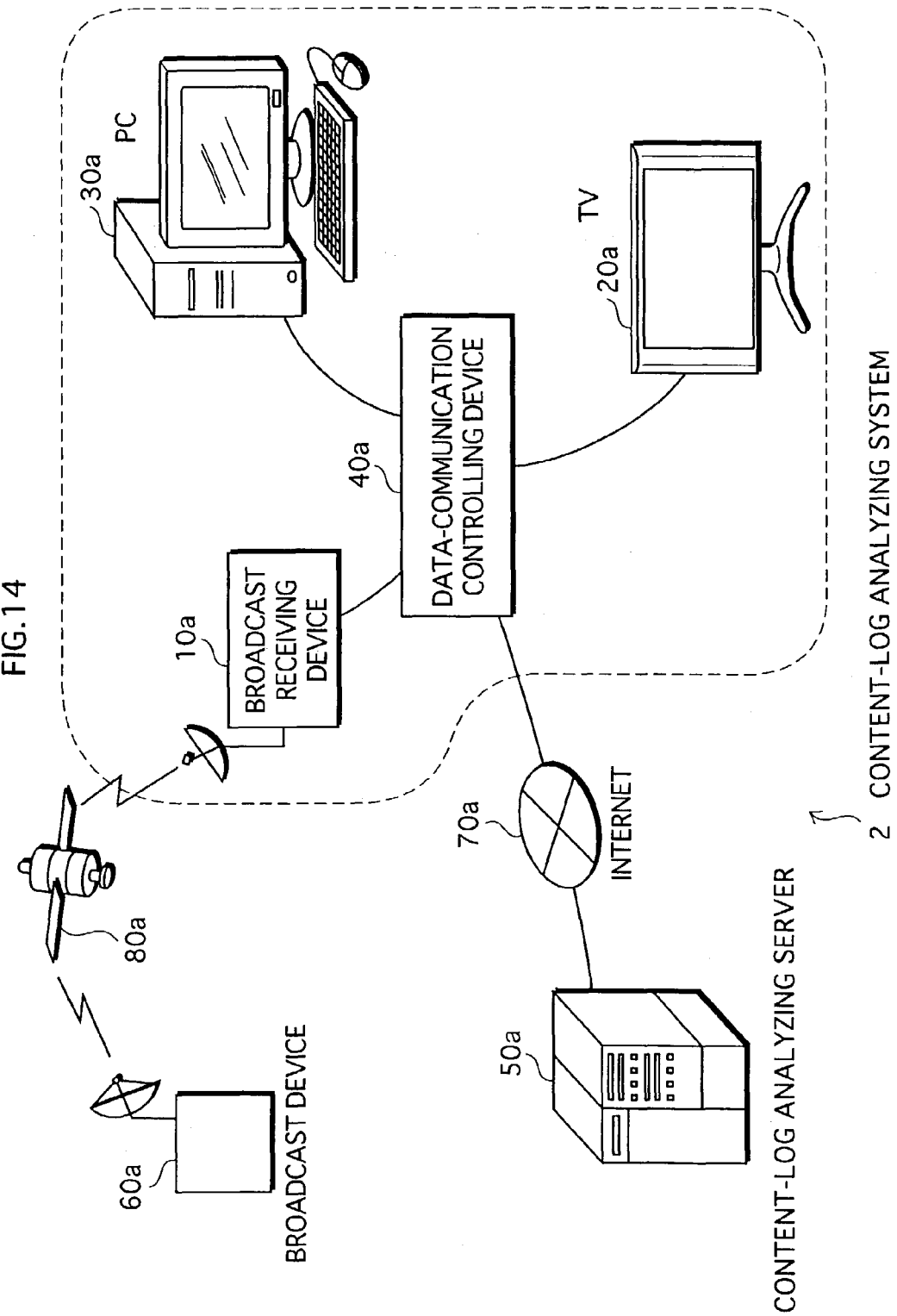
FIG. 14 shows the construction of a content-log analyzing system 2.

FIG. 14 shows the construction of the content-log analyzing system 2. As shown in the figure, the content-log analyzing system 2 is composed of a broadcast receiving device 10*a*, a TV 20*a*, a PC 30*a*, a data-communication controlling device 40*a*, an analyzing-condition changing server 50*a*, and a broadcast device 60*a*.

In FIG. 14, the broadcast receiving device 10*a*, the TV 20*a*, the PC 30*a*, and the data-communication controlling device 40*a* encircled by a broken line are devices placed in a home of the user who views and/or listens to content. The broadcast receiving device 10*a*, the TV 20*a*, and the PC 30*a* are each connected to the data-communication controlling device 40*a* via a LAN cable, and communicate with the data-communication controlling device 40*a*. The analyzing-condition changing server 50*a* and the broadcast device 60*a* are placed in a convent provision center that provides content. The analyzing-condition changing server 50*a* is connected to the data-communication controlling device 40*a* via an Internet 70*a*. The broadcast device 60*a* broadcasts content via a broadcast satellite 80*a*.

The broadcast receiving device 10*a*, the TV 20*a*, the PC 30*a*, and the broadcast device 60*a* respectively have the same constructions and functions as the broadcast receiving device 10, the TV 20, the PC 30, and the broadcast device 60 in the first embodiment, and therefore are not described in the present embodiment. The following describes the data-communication controlling device 40*a* and the analyzing-condition changing server 50*a*, which are different from the corresponding components in the first embodiment.

1. Data-Communication Controlling Device 40*a*

The data-communication controlling device 40*a* routes content from the broadcast receiving device 10*a* to the TV 20*a* or to the PC 30*a*. The data-communication controlling device 40*a* is specifically a router or a gateway. Also, the data-communication controlling device 40*a* is connected to the analyzing-condition changing server 50*a* via the Internet 70*a*, and changes its internally stored analyzing condition upon receipt of an instruction from the analyzing-condition changing server 60*a*.

Figure 15:
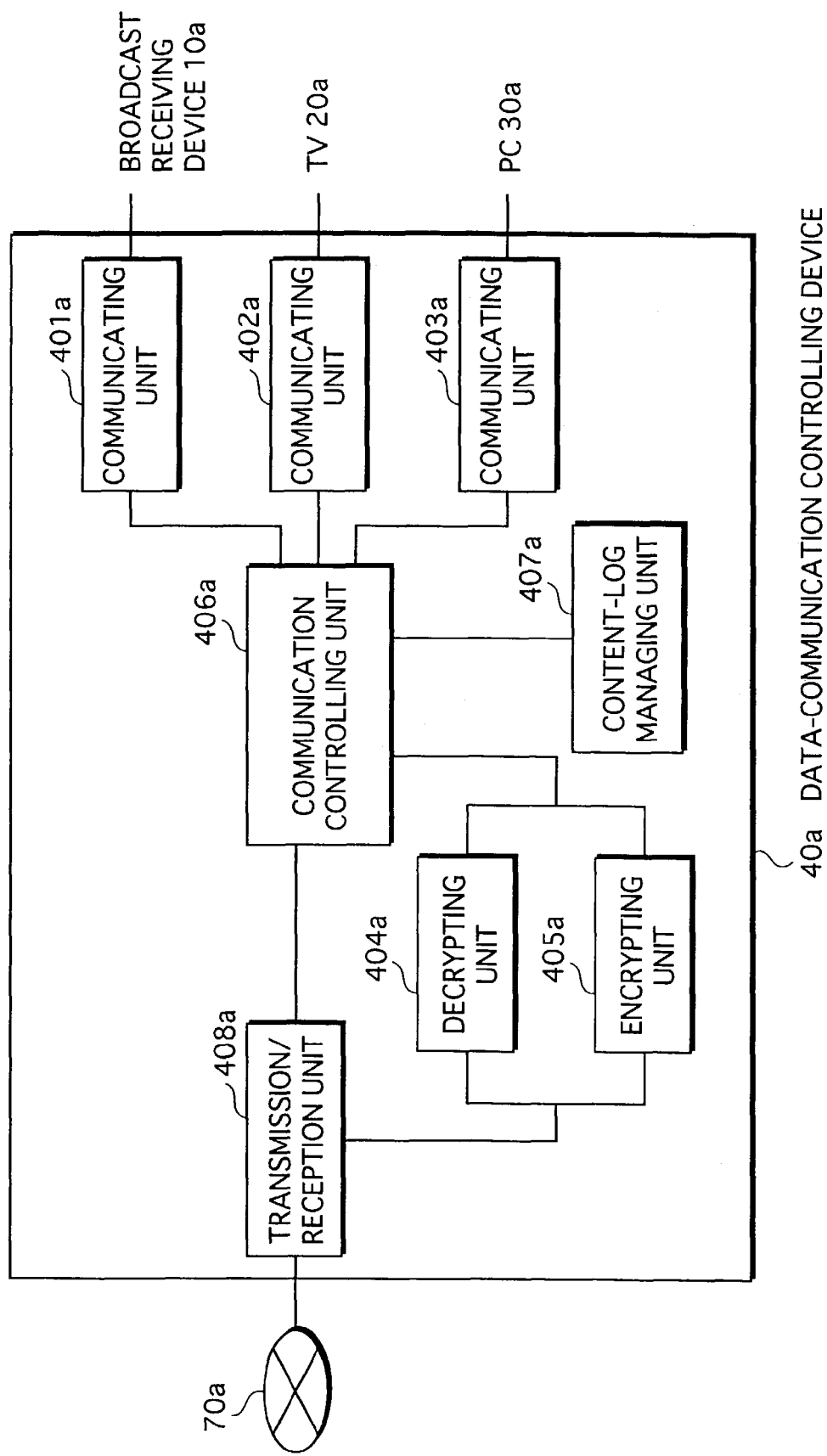

FIG. 15 is a block diagram showing the construction of the data-communication controlling device 40*a*. As shown in the figure, the data-communication controlling device 40*a* is composed of communicating units 401*a*, 402*a*, and 403*a*, a decrypting unit 404*a*, an encrypting unit 405*a*, a communication controlling unit 406*a*, a content-log managing unit 407*a*, and a transmission/reception unit 408*a*. Here, the communicating units 401*a*, 402*a*, and 403*a*, the decrypting unit 404*a*, the encrypting unit 405*a*, the communication controlling unit 406*a*, and the transmission/reception unit 408*a* respectively have the same functions as the components having the corresponding reference numerals in the data-communication controlling device 40 in the first embodiment, and therefore are not described in the present embodiment.

The following particularly describes the content-log managing unit 407*a* that is a component unique to the data-communication controlling device 40*a*. The content-log managing unit 407*a* stores content-log information outputted from the communication controlling unit 406*a* into a content-log table. Also, the content-log managing unit 407*a* internally stores a content-log analyzing condition. The content-log analyzing condition includes an interval at which its internally stored content-log is to be analyzed, and a method for analyzing the content-log. The content-log managing unit 407*a* analyzes the internally stored content-log, based upon the content-log analyzing condition. It should be noted here that the content-log analyzing process executed by the content-log managing unit 407*a* is the same as the process executed by the content-log analyzing server 50 in the first embodiment.

Also, the content-log managing unit 407*a* updates its internally stored content-log analyzing condition, based upon update-information transmitted from the analyzing-condition changing server 50*a* via the communication controlling unit 406*a* and the transmission/reception unit 408*a*. Upon completion of updating the content-log analyzing condition, the content-log managing unit 407a generates update-end-information, and transmits the update-end-information to the analyzing-condition changing server 50a.

It should be noted here that the decrypting unit 404a receives an encrypted content key transmitted from the analyzing-condition changing server 60a, decrypts the encrypted content key using the device key "KD" in the same manner as that described in the first embodiment, and outputs the decrypted content key to the encrypting unit 405a.

2. Analyzing-Condition Changing Server 50a

The analyzing-condition changing server 50a is owned by a manager of content that is distributed in the content-log analyzing system 2. The analyzing-condition changing server 50a is specifically a computer system that is composed of a CPU, a ROM, a RAM, a hard disk unit, an Internet-connected unit, and the like. The analyzing-condition changing server 50a is connected to the data-communication controlling device 40a and to the broadcast device 60a via the Internet 70a. It should be noted here that the construction of the analyzing-condition changing server 50a is not shown.

The analyzing-condition changing server 50a transmits update-information to be used to update the content-log analyzing condition, to the data-communication controlling device 40a via the Internet 70a. As a specific example, the following describes the case where the update-information indicates "an interval at which the content-log is analyzed is to be shortened from 10 min. to 5 min." or the like. The analyzing-condition changing server 50a receives update-end-information indicating that the change of the content-log condition based upon the update-information has been completed, from the data-communication controlling device 40a via the Internet 70a.

Upon receipt of the update-end-information, the analyzing-condition changing server 50a generates a content key, and transmits the generated content key to the broadcast device 60a via the Internet 70a. Also, the analyzing-condition changing server 50a, which in advance shares the device key "KD" with the data-communication controlling device 40a, encrypts the generated content key using the device key "KD", so as to generate an encrypted content key, and transmits the encrypted content key to the data-communication controlling device 40a via the Internet 70a.

<Operation>

Figure 16:
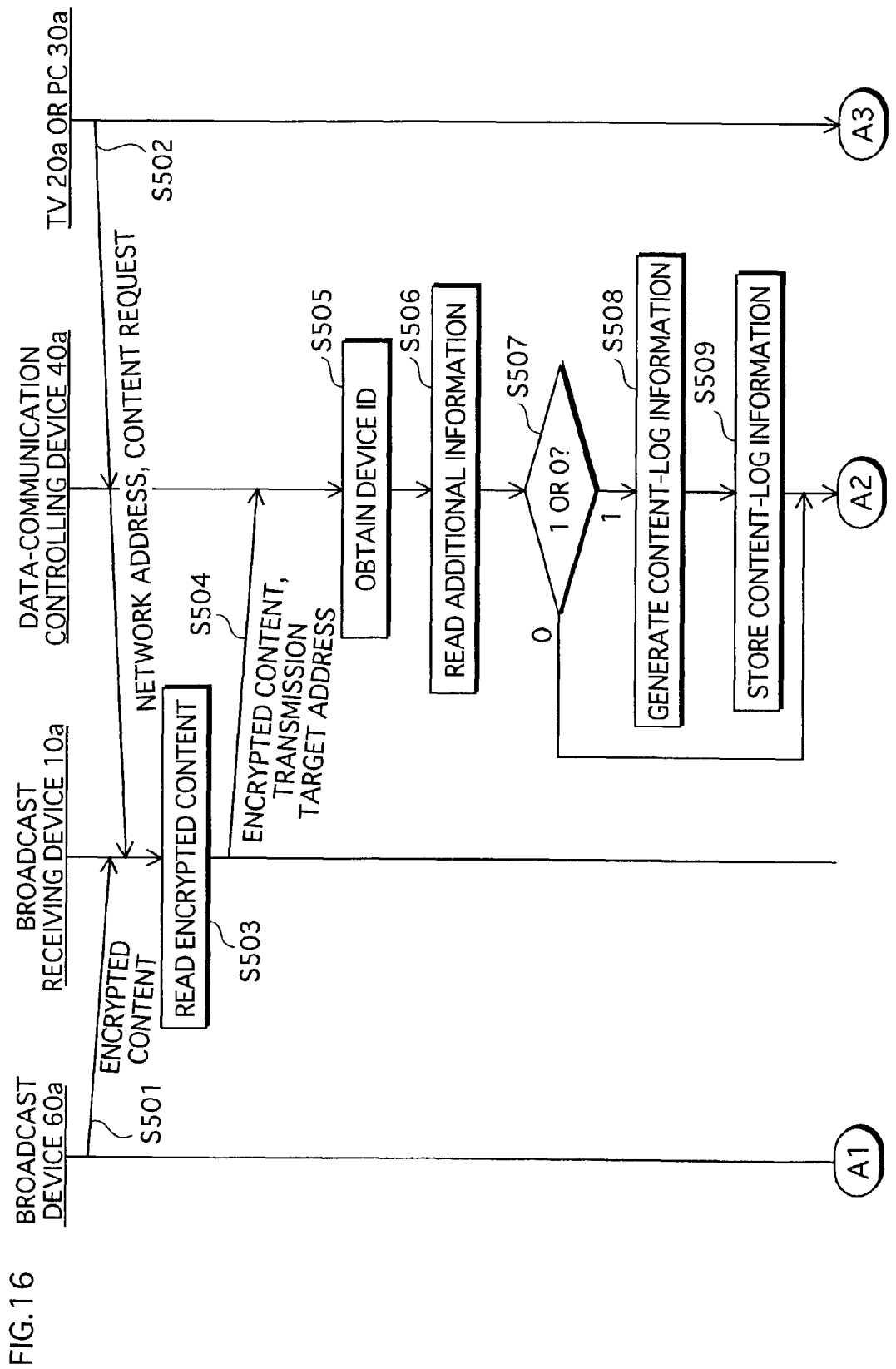
FIG. 16 is a flowchart showing the operation of the content-log analyzing system 2, to be continued to FIG. 17.
Figure 17:
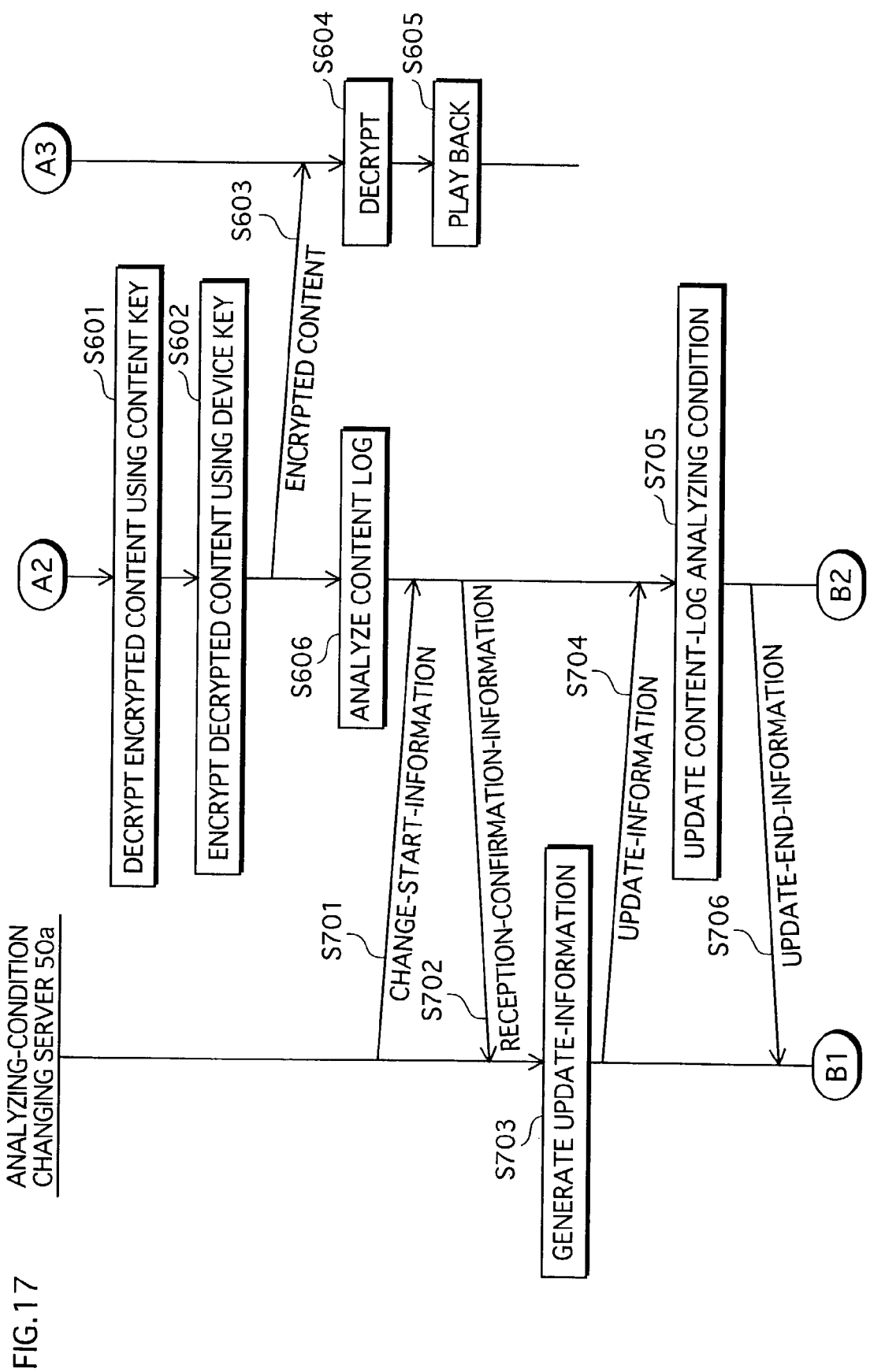
FIG. 17 is a flowchart showing the operation of the content-log analyzing system 2, to be continued to FIG. 18.
Figure 18:
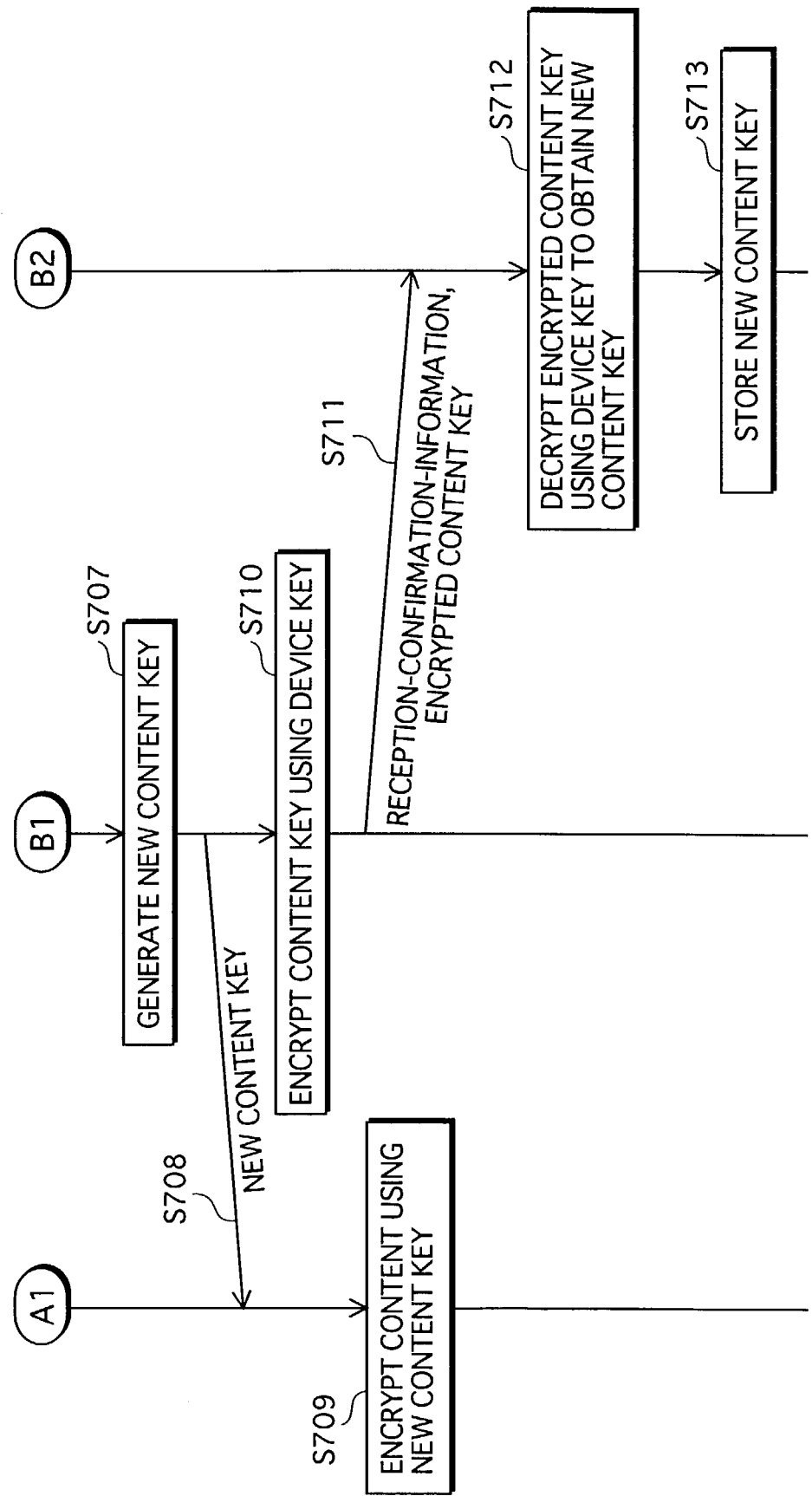
FIG. 18 is a flowchart showing the operation of the content-log analyzing system 2.

The following describes the operation of the content-log analyzing system 2, with reference to flowcharts shown in FIGS. 16 to 18.

1. Content Transmission Process

The broadcast device 60a broadcasts digitized encrypted content on a digital broadcast wave, via the broadcast satellite 80a. The broadcast receiving device 10a receives the encrypted content via the antenna (step S501), and stores the encrypted content.

The TV 20a or the PC 30a transmits a content request including a content ID, and its internally stored network address, to the broadcast receiving device 10a via the data-communication controlling device 40a. The broadcast receiving device 10a receives the content request and the network address (step S502). Here, the network address is "IPA" for the TV 20a, and "IPB" for the PC 30a.

The broadcast receiving device 10a reads encrypted content identified by the content ID included in the content request (step S503). The broadcast receiving device 10a transmits the encrypted content and the transmission target address, to the data-communication controlling device 40a.

The data-communication controlling device 40a receives the encrypted content and the transmission target address (step S504).

The data-communication controlling device 40a obtains a device ID corresponding to the transmission target address, by referring to the internally stored address conversion table (step S505).

Following this, the data-communication controlling device 40a reads additional information included in the encrypted content received from the broadcast receiving device 10a (step S506). When the additional information is "0" ("0" in step S507), the data-communication controlling device 40a moves to step S601. When the additional information is "1" ("1" in step S507), the data-communication controlling unit 40a generates content-log information that is composed of a transmission time, a content ID, a transmission target device ID, and a transmission source device ID (step S508), and internally stores the generated content-log information (step S509)

The data-communication controlling device 40a decrypts the encrypted content using the content key "KC(N−1)" (step S601). Following this, the data-communication controlling device 40a encrypts the decrypted content using a device key shared with a device having the transmission target address, namely, the TV 20a or the PC 30a, so as to generate encrypted content (step S602). The data-communication controlling device 40a transmits the encrypted content that has been encrypted using the device key, to the TV 20a or the PC 30a. The TV 20a or the PC 30a receives the encrypted content (step S603). The TV20a or the PC 30a decrypts the encrypted content using its internally stored device key (step S604), and plays back the decrypted content (step S605). The TV 20a or the PC 30a returns to the start and continues the processing.

The data-communication controlling device 40a analyzes the internally stored content-log, based upon the set content-log analyzing condition (step S606).

2. Analyzing-Condition Changing Process

The analyzing-condition changing server 50a transmits change-start-information "I_S" to the data-communication controlling device 40a. The data-communication controlling device 40a receives the change-start-information "I_S" (step S701). The data-communication controlling device 40a transmits reception-confirmation-information "I_R" indicating that the change-start-information "I_S" has been received, to the analyzing-condition changing server 50a. The analyzing-condition changing server 50a receives the reception-confirmation-information "I_R" (step S702).

Upon receipt of the reception-confirmation-information "I_R", the analyzing-condition changing server 50a generates update-information "I_N" (step S703), and transmits the generated update-information "I_N" to the data-communication controlling device 40a. The data-communication controlling device 40a receives the update-information "I_N" (step S704). The data-communication controlling device 40a updates the internally stored content-log analyzing condition based upon the received update-information "I_N" (step S705). The data-communication controlling device 40a generates update-end-information "I_A", and transmits the generated update-end-information "I_A", to the analyzing-condition changing server 50a. The analyzing-condition changing server 50a receives the update-end-information "I_A" (step S706).

The analyzing-condition changing server 50a generates a new content key "KCN" (step S707). The analyzing-condition changing server 50a transmits the new content key "KCN" to the broadcast device 60a. The broadcast device 60a receives the new content key "KCN" (step S708). The broadcast device 60a encrypts the content using the received new content key "KCN" (step S709), and returns to the start and continues the processing.

The analyzing-condition changing server 50a encrypts the generated new content key "KCN" using, as an encryption key, the device key "KD" that is shared with the data-communication controlling device 40a, so as to generate an encrypted content key "EKCN" (step S710). The analyzing-condition changing server 50a transmits the encrypted content key "EKCN" to the data-communication controlling device 40a. The data-communication controlling device 40a receives the encrypted content key "EKCN" (step S711). The data-communication controlling device 40a decrypts the encrypted content key "EKCN" using the device key "KD", so as to generate a new content key "KCN" (step S712). The data-communication controlling device 40a writes the new content key "KCN" over the content key "KC(N−1)" that has been stored therein (step S713). The data-communication controlling device 40a and the analyzing-condition changing server 50a return to the start and continue the processing.

<Conclusions>

As described above, the present invention relates to a secure router or a home gateway that judges whether or not to record communication of content in the content-log according to a value of the content, and when judging affirmatively, records the communication in the content-log. The present invention also relates to a system including the secure router or the home gateway.

Content to be distributed includes additional information indicating whether or not to record communication of content in the content-log according to a value of the content. The broadcast receiving device that functions as a server in the home network transmits content to a TV, a PC, or the like, via the secure router.

When transmitting content to the TV, the PC, or the like, the secure router reads additional information included in the content. When the additional information indicates to record the communication in the content-log, the secure router generates and stores content-log information, and then transmits the content.

Also, the present invention includes an analyzing device that analyzes the content-log into which content-log information is accumulated by the secure router, for the purpose of early-detecting such a situation where the content is being subjected to attack. For the purpose of urging the secure router to transmit the content-log, the analyzing device makes it a rule to transmit a new content key to the secure router only when the secure router has transmitted the content-log thereto. Also, the broadcast device makes it a rule to broadcast, to the secure router, encrypted content that has been encrypted using the new content key. With the system construction described above, the secure router cannot decrypt encrypted content received from the broadcast receiving device without first transmitting the content-log to the analyzing device.

<Other Modifications>

Although the present invention is described based upon the above embodiments, it should be clear that the present invention is not limited to the above embodiments. For example, the following modifications are within the scope of the present invention.

(1) Although the above embodiments describe the construction where the TV 20 or the PC 30 transmits a content request to the broadcast receiving device 10, the present invention also includes the construction where the broadcast receiving device 10 prestores a transmission target address of content, and transmits content and its corresponding transmission target address prestored therein to the data-communication controlling device 40 upon receipt of the content.

(2) Although the above embodiments describe the construction where the home network is realized by connection via a LAN cable, the present invention also includes the construction where each device belonging to the home network communicates with one another via a wireless LAN.

(3) Although the above embodiments describe the construction where each of the content key "KC1", the device key "KA", the device key "KB", and the device key "KD" is recorded in advance on a ROM, to allow each key to be shared between devices, the present invention also includes the construction where these keys can be shared by way of communication between devices. A method for sharing keys by way of communication is described in detail in Tatsuaki Okamoto and Hirosuke Yamamoto's "*Gendai Ango* (Modern Cryptography)" published by Sangyo Tosho in 1977. Further, an encryption algorithm used therein is not limited to the DES.

(4) The newly generated content key "KCN" is transmitted from the content-log analyzing server 50 to the broadcast device 60 via the Internet 70 using a method for realizing secure transmission.

(5) The additional information may be a part or all of a content ID.

(6) The present invention also includes the construction where the broadcast receiving device 10 includes the data-communication controlling device 40. To be more specific, the broadcast receiving device 10 may have the construction of the data-communication controlling device 40 and the routing function, and may check additional information included in content, and generate and store content-log information.

(7) Although the above embodiments describe the case where two devices, namely, the TV 20 and the PC 30, can be transmission target devices, three or more devices may be provided as transmission target devices. Also, although the above embodiment describes the case where content may be of either of two types, namely, "Free" or "High-Value", the content may be of another type. Further, according to types of content, more types of additional information may be provided.

(8) Examples of content include digitized movies, music, still images, moving images, game software, computer programs, and various other kinds of data. Also, a path on which content is to be distributed is not limited to digital broadcasting. The present invention also includes other content distribution paths such as the Internet, analogue broadcast waves, cable television, and packaged software.

(9) Although the above embodiments describe the construction where the content key used by the data-communication controlling device 40 to decrypt encrypted content is to be updated to the new content key, which is obtained from the content-log analyzing server 50 in exchange for the transmission of the content-log, the present invention also includes the construction where the content key is not updated to the new content key, but the old and new content keys are accumulated.

(10) Although the above embodiment describes the construction where the judgment about whether or not to record communication of content in the content-log is performed using additional information included in the content, the present invention also includes the construction where this judgment is performed using license information included in the content. For example, the construction may be such that the communication is recorded when the license information indicates the content type "High-Value", and the communication is not recorded when the license information indicates the content type "Free".

(11) When the data size of content is large, the data-communication controlling device 40 may not receive the entire content, but may receive a predetermined part of the content to judge whether or not to record communication of the content in the content-log. After the judgment, the data-communication controlling device 40 may receive the entire content while successively transmitting received parts of the content to a transmission target device.

Also, although the above embodiment describes the construction where the data-communication controlling device 40 obtains a device ID using the address conversion table upon receipt of a network address, the present invention also includes the construction where a network address is not provided and the transmission target device is specified using only a device ID. In this case, the TV 20 or the PC 30 transmits a content request and a device ID to the broadcast receiving device 10 via the data-communication controlling device 40, and the broadcast receiving device 10 transmits the content and the device ID to the data-communication controlling device 40.

(12) The present invention may be realized by methods described in the above embodiment. Also, the present invention may be realized by a computer program executed on a computer for realizing these methods.

Also, the present invention may be realized by a computer-readable recording medium on which the computer program is recorded. Examples of the computer-readable recording medium include a flexible disk, a hard disk, a CD-ROM, an MO, a DVD-ROM, a DVD-RAM, and a semiconductor memory. Also, the present invention may be realized by the computer program recorded on such recording media.

Moreover, the present invention may be realized by a computer system including a microprocessor and a memory. The memory may store the computer program, and the microprocessor may operate in accordance with the computer program.

The computer program may be transferred as being recorded on the recording medium so that the computer program may be executed by another independent computer system.

(13) The above embodiment and the modifications can be freely combined.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A content distributing system for transmitting content including license information indicating a content type of the content, the content distributing system comprising:
- a transmission device;
- a routing device;
- a reception device; and
- an analyzing device that stores therein an analysis condition that includes a predetermined number and a predetermined time period, wherein
- the transmission device is operable to transmit to the routing device a transmission target address specifying the reception device and the content, the content being associated with copy control information regarding a number of times the content is able to be copied, the copy control information not limiting a number of times the content is able to be transmitted to the reception device specified by the transmission target address, the number of times the content is able to be copied being distinct from the number of times the content is able to be transmitted,
- the routing device is operable (i) to receive the transmission target address and the content from the transmission device, (ii) to transmit the content to the reception device specified by the transmission target address, (iii) to judge whether or not to generate log information using the license information included with the content, the log information indicating that the content has been transmitted from the transmission device to the reception device, and (iv) only when judging that the log information is to be generated, to generate the log information and store the generated log information,
- the reception device is operable to receive the content transmitted from the routing device, and
- the analyzing device is operable to obtain the log information from the routing device, to count a number of times the same content is transmitted to the same reception device based on the obtained log information, to determine whether the counted number of times the same content is transmitted to the same reception device within the predetermined time period exceeds the predetermined number, and to judge that the reception device is an unauthorized device when it is determined that the counted number of times the same content is transmitted to the same reception device within the predetermined time period exceeds the predetermined number.

2. The content distributing system of claim 1, wherein
the routing device stores the predetermined number, and
the analyzing device obtains the predetermined number from the routing device.

3. The content distributing system of claim 1, wherein the copy control information regarding the number of times the content is able to be copied comprises at least one of "copy free", "copy once", "copy no more" and "copy never".

4. The content distributing system of claim 1, wherein
if judged that the reception device is an unauthorized device, the analyzing device creates a blacklist that contains an ID of the reception device, and thereafter monitors the reception device listed in the blacklist.

5. A routing device for routing content, the content including license information indicating a content type of the content, from a transmission device to a reception device, the routing device comprising:
- a receiving unit operable to receive from the transmission device content and a transmission target address specifying the reception device, the content being associated with copy control information regarding a number of times the content is able to be copied, the copy control information not limiting a number of times the content is able to be transmitted to the reception device specified by the transmission target address, the number of times the content is able to be copied being distinct from the number of times the content is able to be transmitted;
- a routing unit operable to transmit the content to the reception device specified by the transmission target address;
- a log information generating unit operable to judge whether or not to generate log information using the license information included with the content, the log information indicating that the content has been routed from the transmission device to the reception device, and only when judging that the log information is to be generated, to generate the log information and store the generated log information; and an analyzing unit that stores therein an analysis condition that includes a predetermined number and a predetermined time period, and is operable to obtain the log information from the log information generating unit, to count a number of times the same content is transmitted to the same reception device based on the obtained log information, to determine whether the counted number of times the same content is transmitted to the same reception device within the predetermined time period exceeds the predetermined number, and to judge that the reception device is an unauthorized device when it is determined that the counted number of the times the same content is transmitted to the same reception device within the predetermined time period exceeds the predetermined number.

6. The routing device of claim 5, wherein the routing device has a device ID that uniquely identifies the routing device, and a certificate that is used to authenticate the device ID, the routing device further comprises:

a log request receiving unit operable to receive a log request from an external analyzing device that analyzes the log information, the log request requesting transmission of the log information stored in the log information generating unit; and a log transmitting unit operable to transmit, to the analyzing device, the device ID, the certificate, and the log information that is stored in the log information generating unit, and the routing device is authenticated by the analyzing device based upon the device ID and the certificate transmitted to the analyzing device.

7. The routing device of claim 6, wherein the receiving unit is operable to receive content that includes first encrypted content information, the first encrypted content information having been generated by encrypting, using first key information, content information including video data and audio data, and the routing device further comprises:

a first key information obtaining unit operable to obtain the first key information;

a decrypting unit operable to decrypt the first encrypted content information using the first key information obtained by the first key information obtaining unit, so as to generate first content information;

a second key information storing unit operable to store second key information that is different from the first key information; and an encrypting unit operable to encrypt the first content information generated by the decrypting unit, using the second information stored in the second key information storing unit, so as to generate second encrypted content information, and the routing unit is operable to transmit content that includes the second encrypted content information generated by the encrypting unit, to the reception device.

8. The routing device of claim 7, wherein the first key information obtaining unit includes:

a third key information storing unit operable to store third key information that is different from the first key information and the second key information;

an encrypted first key information receiving unit operable to receive, from the analyzing device, encrypted first key information generated by encrypting the first key information using the third key information; and a decrypting unit operable to decrypt the encrypted first key information received by the encrypted first key information receiving unit, using the third key information, so as to obtain the first key information.

9. The routing device of claim 5, wherein the receiving unit further receives additional information associated with the content and the transmission target address from the transmission device, the additional information indicating, according to a property of the content, whether or not to log communication of the content when the content is transmitted from the routing device to the reception device, and the log information generating unit generates the log information and stores the generated log information, when the additional information received by the receiving unit indicates to log the communication.

10. An analyzing device that stores therein an analysis condition that includes a predetermined number and a predetermined time period and analyzes log information generated by a routing device that routes content, the content including license information indicating a content type of the content, from a transmission device to a reception device, the analyzing device comprising:

a log receiving unit operable to obtain the log information from the routing device only when the routing device has judged, using the license information included with the content, that the log information is to be generated and generated the log information, the log information indicating that content has been routed from the transmission device to the reception device, the content being associated with copy control information regarding a number of times the content is able to be copied, the copy control information not limiting a number of times the content is able to be transmitted to the reception device specified by the transmission target address, the number of times the content is able to be copied being distinct from the number of times the content is able to be transmitted; and an analyzing unit operable to count a number of times the same content is transmitted to the same reception device based on the obtained log information, to determine whether the counted number of times the same content is transmitted to the same reception device within the predetermined time period exceeds the predetermined number, and to judge that the reception device is an unauthorized device, when it is determined that the counted number of times the same content is transmitted to the same reception device within the predetermined time period exceeds the predetermined number.

11. The analyzing device of claim 10, wherein the routing device has a device ID that uniquely identifies the routing device, and the analyzing device further comprises:

a log transmission table storing unit operable to store a log transmission table showing a device ID of the routing device that has transmitted the log information to the analyzing device in response to a log request from the analyzing device, the log request requesting transmission of the log information;

a device ID receiving unit operable to receive the device ID together with the log information, from the routing device; and a log transmission table writing unit operable to write the device ID into the log transmission table when the log receiving unit receives the log information and the device ID.

12. The analyzing device of claim 10, wherein
the routing device has a device ID that uniquely identifies the routing device, and a certificate that is used to authenticate the device ID, and
the analyzing device further comprises:
a log transmission table storing unit operable to store a log transmission table showing a device ID of the routing device that has transmitted the log information to the analyzing device in response to a log request from the analyzing device, the log request requesting transmission of the log information;
a certificate receiving unit operable to receive the device ID and the certificate, together with the log information, from the routing device;
an authenticating unit operable to authenticate the device ID by authenticating the certificate received by the certificate receiving unit; and
a log transmission table writing unit operable to write the device ID into the log transmission table when the device ID is successfully authenticated by the authenticating unit.

13. The analyzing device of claim 12, further comprising:
a key information generating unit operable to generate key information when the device ID is written into the log transmission table;
an encryption key storing unit operable to store an encryption key that is different from the key information;
an encrypting unit operable to encrypt the key information using the encryption key, so as to generate encrypted key information; and
an encrypted key information transmitting unit operable to transmit the encrypted key information to the routing device identified by the device ID.

14. The analyzing device of claim 10, wherein
the analyzing unit judges that the reception device is an unauthorized device when it is determined that the counted number of times the same content is transmitted to the reception device exceeds a predetermined number during a prescribed period.

15. A content distributing system for transmitting content including license information indicating a content type of the content, the content distributing system comprising:
a transmission device;
a routing device that stores therein an analysis condition that includes a predetermined number and a predetermined time period; and
a reception device, wherein
the transmission device is operable to transmit to the routing device content and a transmission target address specifying the reception device, the content being associated with copy control information regarding a number of times the content is able to be copied, the copy control information not limiting a number of times the content is able to be transmitted to the reception device specified by the transmission target address, the number of times the content is able to be copied being distinct from the number of times the content is able to be transmitted,
the routing device is operable (i) to receive the content and the transmission target address, (ii) to transmit the content to the same reception device specified by the transmission target address, (iii) to judge whether or not to generate log information using the license information included with the content, the log information indicating that the content has been routed from the transmission device to the reception device, (iv) only when judging that the log information is to be generated, to generate the log information, (v) to count a number of times the same content is transmitted to the reception device based on the generated log information, (vi) to determine whether the counted number of times the same content is transmitted to the same reception device within the predetermined time period exceeds the predetermined number, and (vii) to judge that the reception device is an unauthorized device when it is determined that the counted number of times the same content is transmitted to the same reception device within the predetermined time period exceeds the predetermined number, and
the reception device is operable to receive the content transmitted from the routing device.

16. The content distributing system of claim 15,
further comprising an analyzing-condition updating device operable to transmit, to the routing device, information for updating the analyzing condition stored in the routing device, wherein
the routing device is operable to receive the update information from the analyzing-condition updating device and update the analyzing condition internally stored therein based upon the received update information.

17. A routing method for use in a routing device that stores therein an analysis condition that includes a predetermined number and a predetermined time period, and routes content, the content including license information indicating a content type of the content, from a transmission device to a reception device, the routing method comprising:
receiving content and a transmission target address specifying the reception device from the transmission device, the content being associated with copy control information regarding a number of times the content is able to be copied, the copy control information not limiting a number of times the content is able to be transmitted to the reception device specified by the transmission target address, the number of times the content is able to be copied being distinct from the number of times the content is able to be transmitted;
transmitting the content to the reception device specified by the transmission target address;
judging whether or not to generate log information using the license information included with the content, the log information indicating that the content has been routed from the transmission device to the reception device, and only when judging that the log information is to be generated, generating the log information;
counting a number of times the same content is transmitted to the same reception device based on the generated log information;
determining whether the counted number of the times the same content is transmitted to the same reception device within the predetermined time period exceeds the predetermined number; and
judging that the reception device is an unauthorized device when it is determined that the counted number of times the same content is transmitted to the same reception device within the predetermined time period exceeds the predetermined number.

18. A routing program recorded on a non-transitory computer-readable recording medium for use in a routing device that stores therein an analysis condition that includes a predetermined number and a predetermined time period, and routes content, the content including license information indicating a content type of the content, from a transmission device to a reception device, the routing program causing the routing device to execute a method comprising:

a receiving operation of receiving content and a transmission target address specifying the reception device from the transmission device, the content being associated with copy control information regarding a number of times the content is able to be copied, the copy control information not limiting a number of times the content is able to be transmitted to the reception device specified by the transmission target address, the number of times the content is able to be copied being distinct from the number of times the content is able to be transmitted;

a routing operation of transmitting the content to the reception device specified by the transmission target address;

a log information generating operation of judging whether or not to generate log information using the license information included with the content, the log information indicating that the content has been routed from the transmission device to the reception device, and only when judging that the log information is to be generated, generating the log information;

a counting operation of counting a number of times the same content is transmitted to the same reception device based on the generated log information;

a determining operation of determining whether the counted number of times the same content is transmitted to the same reception device within the predetermined time period exceeds the predetermined number; and a judging operation of judging that the reception device is an unauthorized device when it is determined that the counted number of times the same content is transmitted to the same reception device within the predetermined time period exceeds the predetermined number.

19. An analyzing method for use in an analyzing device that stores therein an analysis condition that includes a predetermined number and a predetermined time period, and analyzes log information generated by a routing device that routes content, the content including license information indicating a content type of the content, from a transmission device to a reception device, the analyzing method comprising:

obtaining the log information from the routing device only when the routing device has judged, using the license information included with the content, that the log information is to be generated and generated the log information, the log information indicating that the content has been routed from the transmission device to the reception device, the content being associated with copy control information regarding a number of times the content is able to be copied, the copy control information not limiting a number of times the content is able to be transmitted to the reception device, the number of times the content is able to be copied being distinct from the number of times the content is able to be transmitted;

counting a number of times the same content is transmitted to the same reception device based on the obtained log information;

determining whether the counted number of times the same content is transmitted to the same reception device within the predetermined time period exceeds the predetermined number; and judging that the reception device is an unauthorized device when it is determined that the counted number of times the same content is transmitted to the same reception device within the predetermined time period exceeds the predetermined number.

20. An analyzing program recorded on a non-transitory computer-readable recording medium for use in an analyzing device that analyzes log information generated by a routing device that stores therein an analysis condition that includes a predetermined number and a predetermined time period, and routes content, the content including license information indicating a content type of the content, from a transmission device to a reception device, the analyzing program causing the analyzing device to execute a method comprising:

an obtaining operation of obtaining from the routing device only when the routing device has judged, using the license information included with the content, that the log information has been generated and generated the log information, the log information indicating that content has been routed from the transmission device to the reception device, the content being associated with copy control information regarding a number of times the content is able to be copied, the copy control information not limiting a number of times the content is able to be transmitted to the reception device, the number of times the content is able to be copied being distinct from the number of times the content is able to be transmitted; and an analyzing operation of counting a number of times the same content is transmitted to the same reception device based on the obtained log information, of determining whether the counted number of times the same content is transmitted to the same reception device within the predetermined time period exceeds the predetermined number, and of judging that the reception device is an unauthorized device when it is determined that the counted number of times the same content is transmitted to the same reception device within the predetermined time period exceeds the predetermined number.

21. A routing device having a device ID that uniquely identifies the routing device, and a certificate that is used to authenticate the device ID, the routing device for routing content from a transmission device to a reception device, the routing device comprising:

a receiving unit operable to receive from the transmission device content and a transmission target address specifying the reception device, the content being associated with copy control information regarding a number of times the content is able to be copied, the copy control information not limiting a number of times the content is able to be transmitted to the reception device specified by the transmission target address, the number of times the content is able to be copied being distinct from the number of times the content is able to be transmitted;

a routing unit operable to transmit the content to the reception device specified by the transmission target address;

a log information generating unit operable to generate log information, the log information indicating that the content has been routed from the transmission device to the reception device, and to store the generated log information;

a log request receiving unit operable to receive a log request from an external analyzing device that analyzes the log information, the log request requesting transmission of the log information stored in the log information generating unit;

a log transmitting unit operable to transmit, to the analyzing device, the device ID, the certificate, and the log information that is stored in the log information generating unit; and an analyzing unit that stores therein an analysis condition that includes a predetermined number and a predetermined time period, and is operable to obtain the log information from the log information generating unit, to count a number of times the same content is transmitted to the same reception device based on the obtained log information, to determine whether the counted number of times the same content is transmitted to the same reception device within the predetermined time period exceeds the predetermined number, and to judge that the reception device is an unauthorized device when it is determined that the counted number of the times the same content is transmitted to the same reception device within the predetermined time period exceeds the predetermined number, wherein the routing device is authenticated by the analyzing device based upon the device ID and the certificate transmitted to the analyzing device, the receiving unit is operable to receive content that includes first encrypted content information, the first encrypted content information having been generated by encrypting, using first key information, content information including video data and audio data, and the routing device further comprises:
- a first key information obtaining unit operable to obtain the first key information;
- a decrypting unit operable to decrypt the first encrypted content information using the first key information obtained by the first key information obtaining unit, so as to generate first content information;
- a second key information storing unit operable to store second key information that is different from the first key information; and
- an encrypting unit operable to encrypt the first content information generated by the decrypting unit, using the second information stored in the second key information storing unit, so as to generate second encrypted content information, and the routing unit is operable to transmit content that includes the second encrypted content information generated by the encrypting unit, to the reception device.

22. The routing device of claim 21, wherein
the first key information obtaining unit includes:
- a third key information storing unit operable to store third key information that is different from the first key information and the second key information;
- an encrypted first key information receiving unit operable to receive, from the analyzing device, encrypted first key information generated by encrypting the first key information using the third key information; and
- a decrypting unit operable to decrypt the encrypted first key information received by the encrypted first key information receiving unit, using the third key information, so as to obtain the first key information.

23. An analyzing device that stores therein an analysis condition that includes a predetermined number and a predetermined time period and analyzes log information generated by a routing device that routes content from a transmission device to a reception device, the routing device having a device ID that uniquely identifies the routing device, and a certificate that is used to authenticate the device ID, the analyzing device comprising:
- a log receiving unit operable to obtain, from the routing device, log information indicating that content has been routed from the transmission device to the reception device, the content being associated with copy control information regarding a number of times the content is able to be copied, the copy control information not limiting a number of times the content is able to be transmitted to the reception device specified by the transmission target address, the number of times the content is able to be copied being distinct from the number of times the content is able to be transmitted;
- an analyzing unit operable to count a number of times the same content is transmitted to the same reception device based on the obtained log information, to determine whether the counted number of times the same content is transmitted to the same reception device within the predetermined time period exceeds the predetermined number, and to judge that the reception device is an unauthorized device, when it is determined that the counted number of times the same content is transmitted to the same reception device within the predetermined time period exceeds the predetermined number;
- a log transmission table storing unit operable to store a log transmission table showing a device ID of the routing device that has transmitted the log information to the analyzing device in response to a log request from the analyzing device, the log request requesting transmission of the log information;
- a certificate receiving unit operable to receive the device ID and the certificate, together with the log information, from the routing device;
- an authenticating unit operable to authenticate the device ID by authenticating the certificate received by the certificate receiving unit;
- a log transmission table writing unit operable to write the device ID into the log transmission table when the device ID is successfully authenticated by the authenticating unit;
- a key information generating unit operable to generate key information when the device ID is written into the log transmission table;
- an encryption key storing unit operable to store an encryption key that is different from the key information;
- an encrypting unit operable to encrypt the key information using the encryption key, so as to generate encrypted key information; and
- an encrypted key information transmitting unit operable to transmit the encrypted key information to the routing device identified by the device ID.

* * * * *